US010762910B2

(12) United States Patent
Mirzahasanloo et al.

(10) Patent No.: US 10,762,910 B2
(45) Date of Patent: Sep. 1, 2020

(54) HIERARCHICAL FINE QUANTIZATION FOR AUDIO CODING

(71) Applicant: QUALCOMM Incorporated, San Diego, CA (US)

(72) Inventors: Taher Shahbazi Mirzahasanloo, San Diego, CA (US); Rogerio Guedes Alves, Macomb Township, MI (US)

(73) Assignee: Qualcomm Incorporated, San Diego, CA (US)

( * ) Notice: Subject to any disclaimer, the term of this patent is extended or adjusted under 35 U.S.C. 154(b) by 83 days.

(21) Appl. No.: 16/050,914

(22) Filed: Jul. 31, 2018

(65) Prior Publication Data

US 2019/0371347 A1 Dec. 5, 2019

Related U.S. Application Data

(60) Provisional application No. 62/679,294, filed on Jun. 1, 2018.

(51) Int. Cl.
*G10L 19/00* (2013.01)
*G10L 19/038* (2013.01)
(Continued)

(52) U.S. Cl.
CPC ........ *G10L 19/038* (2013.01); *G10L 19/0204* (2013.01); *G10L 25/18* (2013.01); *H04W 4/80* (2018.02)

(58) Field of Classification Search
CPC ... G10L 19/038; G10L 19/0204; G10L 25/18; H04W 4/80
(Continued)

(56) References Cited

U.S. PATENT DOCUMENTS 4,023,199 A * 5/1977 Netravali ............. H04N 11/046
375/240.25
6,026,082 A * 2/2000 Astrin ..................... H04M 3/56
370/336
(Continued)

OTHER PUBLICATIONS

Valin J-M. et al., "A Full Bandwidth Audio Codec with Low Complexity and Very Low Delay," EUSIPCO 2009, Octasic Incorporation, Retrieved from the Internet: www.octasic.com, pp. 1-16.
(Continued)

*Primary Examiner* — Md S Elahee
(74) *Attorney, Agent, or Firm* — Shumaker & Sieffert

(57) ABSTRACT

In general, this disclosure describes techniques for seamless audio data compression control system that can respond to the increasing adaptation demands for source coding characteristics to accommodate co-existence of various devices in a personal area network. In one example, a source device includes a memory and one or more processors in communication with the memory. The memory is configured to store audio data. The one or more processors are configured to select, based on a nominal compression ratio or a streaming rate, a compression level of multiple compression levels, the multiple compression levels arranged hierarchically to allow for dynamic transitioning between the compression levels. The one or more processors are further configured to encode, based on the selected compression level of the multiple compression levels, the audio data stored to the memory.

26 Claims, 12 Drawing Sheets

(51) Int. Cl.
*H04W 4/80* (2018.01)
*G10L 25/18* (2013.01)
*G10L 19/02* (2013.01)

(58) Field of Classification Search
USPC .................. 704/500–504, E19.001; 370/394;
375/240.25; 707/654
See application file for complete search history.

(56) References Cited

U.S. PATENT DOCUMENTS

| | | |
|---|---|---|
| 8,090,587 B2 | 1/2012 | Jung et al. |
| 8,566,286 B1 * | 10/2013 | Hawton .............. G06F 11/1458 |
| | | 707/654 |
| 9,385,750 B2 | 7/2016 | Norvell et al. |
| 9,508,356 B2 | 11/2016 | Yamanashi et al. |
| 9,672,837 B2 | 6/2017 | Purnhagen et al. |
| 9,767,815 B2 | 9/2017 | Liu et al. |
| 2006/0293884 A1 | 12/2006 | Grill et al. |
| 2012/0263312 A1 | 10/2012 | Takada |
| 2013/0046546 A1 * | 2/2013 | Uhle ...................... H03G 9/025 |
| | | 704/500 |
| 2013/0080157 A1 | 3/2013 | Kim et al. |
| 2015/0179182 A1 | 6/2015 | Vinton et al. |

OTHER PUBLICATIONS

"Bluetooth Core Specification v 5.0," published Dec. 6, 2016 accessed from https://www.bluetooth.com/specifications, 5 pp.
"Advanced Audio Distribution Profile Specification," version 1.3.1, published Jul. 14, 2015, 35 pp.

* cited by examiner

HIERARCHICAL FINE QUANTIZATION FOR AUDIO CODING

This application claims the benefit of U.S. Provisional Application No. 62/679,294, filed 1 Jun. 2018, the entire content of which is incorporated herein by reference.

TECHNICAL FIELD

This disclosure relates to audio encoding and decoding.

BACKGROUND

Wireless networks for short-range communication, which may be referred to as "personal area networks," are established to facilitate communication between a source device and a sink device. One example of a personal area network (PAN) protocol is Bluetooth®, which is often used to form a PAN for streaming audio data from the source device (e.g., a mobile phone) to the sink device (e.g., headphones or a speaker).

In some examples, the Bluetooth® protocol is used for streaming encoded or otherwise compressed audio data. In some examples, audio data is encoded using gain-shape vector quantization audio encoding techniques. In gain-shape vector quantization audio encoding, audio data is transformed into the frequency domain and then separated into sub-bands of transform coefficients. A scalar energy level (e.g., gain) of each sub-band is encoded separately from the shape (e.g., a residual vector of transform coefficients) of the sub-band.

SUMMARY

In general, this disclosure relates to techniques for seamless audio data compression control system that can respond to the increasing adaptation demands for source coding characteristics to accommodate co-existence of various devices in a personal area network (PAN). Aspects of this disclosure are directed to extending uniform audio energy quantization systems to include a tree-structured hierarchical rate control. The hierarchical rate control techniques of this disclosure provide functionalities to branch out multiple compression levels based on a target compression ratio or streaming rate. Moreover, the hierarchical rate control techniques of this disclosure provide for seamless transition to higher or lower compression levels without introducing coding artifacts.

In one aspect, this disclosure is directed to a source device comprising a memory configured to store audio data; and one or more processors in communication with the memory. The one or more processors are configured to select, based on a nominal compression ratio or a streaming rate, a compression level of multiple compression levels, the multiple compression levels arranged hierarchically to allow for dynamic transitioning between the compression levels. The one or more processors are further configured to encode, based on the selected compression level of the multiple compression levels, the audio data stored to the memory.

In another aspect, this disclosure is directed to a method of processing audio data. The method includes selecting, based on a nominal compression ratio or a streaming rate, a compression level of multiple compression levels, the multiple compression levels arranged hierarchically to allow for dynamic transitioning between the compression levels. The method further includes encoding the audio data based on the selected compression level of the multiple compression levels.

In another aspect, this disclosure is directed to an apparatus configured to process audio data. The apparatus includes means for selecting, based on a nominal compression ratio or a streaming rate, a compression level of multiple compression levels, the multiple compression levels arranged hierarchically to allow for dynamic transitioning between the compression levels. The apparatus further includes means for encoding the audio data based on the selected compression level of the multiple compression levels.

In another aspect, this disclosure is directed to a non-transitory computer-readable storage medium encoded with instructions. The instructions, when executed, cause one or more processors of a source device to store audio data to the non-transitory computer-readable storage medium, to select, based on a nominal compression ratio or a streaming rate, a compression level of multiple compression levels, the multiple compression levels arranged hierarchically to allow for dynamic transitioning between the compression levels, and to encode, based on the selected compression level of the multiple compression levels, the stored audio data.

In another aspect, this disclosure is directed to a source device comprising a memory configured to store audio data; and one or more processors in communication with the memory. The one or more processors are configured to determine a first bit allocation for coarse quantization with respect to the sub-band of the audio data stored to the memory, to determine a second bit allocation for fine quantization with respect to the sub-band of the audio data stored to the memory, and to perform the coarse quantization with respect to the sub-band of the audio data based on the first bit allocation. The one or more processors are further configured to perform a first iteration of the fine quantization with respect to the sub-band of the audio data based on the second bit allocation after performing the coarse quantization, to obtain a resulting error with respect to the sub-band, and to perform, based on a comparison of the second bit allocation and a number of bits used to perform the coarse quantization and the first iteration of the fine quantization, additional fine quantization with respect to the error associated with the sub-band.

In another aspect, this disclosure is directed to a method of processing audio data. The method includes determining a first bit allocation for coarse quantization with respect to a sub-band of the audio data, determining a second bit allocation for fine quantization with respect to the sub-band of the audio data, performing the coarse quantization with respect to the sub-band of the audio data based on the first bit allocation. The method further includes performing a first iteration of the fine quantization with respect to the sub-band of the audio data based on the second bit allocation after performing the coarse quantization, to obtain a resulting error with respect to the sub-band, comparing the second bit allocation to a number of bits used to perform the coarse quantization and the first iteration of the fine quantization; and performing, based on the comparison, additional fine quantization with respect to the error associated with the sub-band.

In another aspect, this disclosure is directed to an apparatus configured to process audio data. The apparatus includes means for determining a first bit allocation for coarse quantization with respect to a sub-band of the audio data, means for determining a second bit allocation for fine quantization with respect to the sub-band of the audio data, and means for performing the coarse quantization with respect to the sub-band of the audio data based on the first bit allocation. The apparatus further includes means for performing a first iteration of the fine quantization with respect to the sub-band of the audio data based on the second bit allocation after performing the coarse quantization, to obtain a resulting error with respect to the sub-band, means for comparing the second bit allocation to a number of bits used to perform the coarse quantization and the first iteration of the fine quantization, and means for performing, based on the comparison, additional fine quantization with respect to the error associated with the sub-band.

In another aspect, this disclosure is directed to a non-transitory computer-readable storage medium encoded with instructions. The instructions, when executed, cause one or more processors of a source device to store audio data to the non-transitory computer-readable storage medium, to determine a first bit allocation for coarse quantization with respect to the sub-band of the stored audio data, to determine a second bit allocation for fine quantization with respect to the sub-band of the stored audio data, to perform the coarse quantization with respect to the sub-band of the stored audio data based on the first bit allocation, to perform a first iteration of the fine quantization with respect to the sub-band of the stored audio data based on the second bit allocation after performing the coarse quantization, to obtain a resulting error with respect to the sub-band, and to perform, based on a comparison of the second bit allocation and a number of bits used to perform the coarse quantization and the first iteration of the fine quantization, additional fine quantization with respect to the error associated with the sub-band.

In another aspect, this disclosure is directed to a sink device comprising a memory configured to store frequency domain audio data; and one or more processors in communication with the memory. The one or more processors are configured to receive a quantized error associated with a sub-band of the frequency domain audio data stored to the memory, and to receive a syntax element that is set to a value indicating that the quantized error was quantized using a hierarchical fine quantization process. The one or more processors are further configured to perform, based on the value of the syntax element, a hierarchical inverse quantization with respect to the quantized error.

In another aspect, this disclosure is directed to a method for decoding frequency domain audio data. The method includes receiving a quantized error associated with a sub-band of the frequency domain audio data, and receiving a syntax element that is set to a value indicating that the quantized error was quantized using a hierarchical fine quantization process. The method further includes performing, based on the value of the received syntax element, a hierarchical inverse quantization with respect to the quantized error.

In another aspect, this disclosure is directed to an apparatus configured to decode frequency domain audio data. The apparatus includes means for receiving a quantized error associated with a sub-band of the frequency domain audio data, and means for receiving a syntax element that is set to a value indicating that the quantized error was quantized using a hierarchical fine quantization process. The apparatus further includes means for performing, based on the value of the syntax element, a hierarchical inverse quantization with respect to the quantized error.

In another aspect, this disclosure is directed to a non-transitory computer-readable storage medium encoded with instructions. The instructions, when executed, cause one or more processors of a sink device to store frequency domain audio data to the non-transitory computer-readable storage medium, to receive a quantized error associated with a sub-band of the stored frequency domain audio data, to receive a syntax element that is set to a value indicating that the quantized error was quantized using a hierarchical fine quantization process, and based on the value of the syntax element, perform a hierarchical inverse quantization with respect to the quantized error.

The details of one or more aspects of the techniques are set forth in the accompanying drawings and the description below. Other features, objects, and advantages of these techniques will be apparent from the description and drawings, and from the claims.

DETAILED DESCRIPTION

As transmission and environment-adaptive coding of audio streams gain importance, seamless control of the source coding characteristics and features become increasingly desirable for advanced compression systems. The audio streams are often transmitted via Bluetooth® or other wireless personal area network (PAN) protocols. Seamless control of the source coding features should accommodate co-existing devices, multi-channel source coding, bandwidth-limited streaming, and adaptive compression mechanisms.

This disclosure describes techniques for a seamless audio data compression control system that potentially fulfill such adaptation demands. Audio encoders of this disclosure are configured to extend uniform audio energy quantization systems to include hierarchical rate control that can be represented by a cascaded structure or a tree-based structure. The hierarchical rate control techniques of this disclosure provide functionalities to branch out multiple compression levels based on a target compression ratio or streaming rate. Moreover, the hierarchical rate control techniques of this disclosure provide for seamless transition to higher or lower compression levels without introducing coding artifacts.

Figure 1:
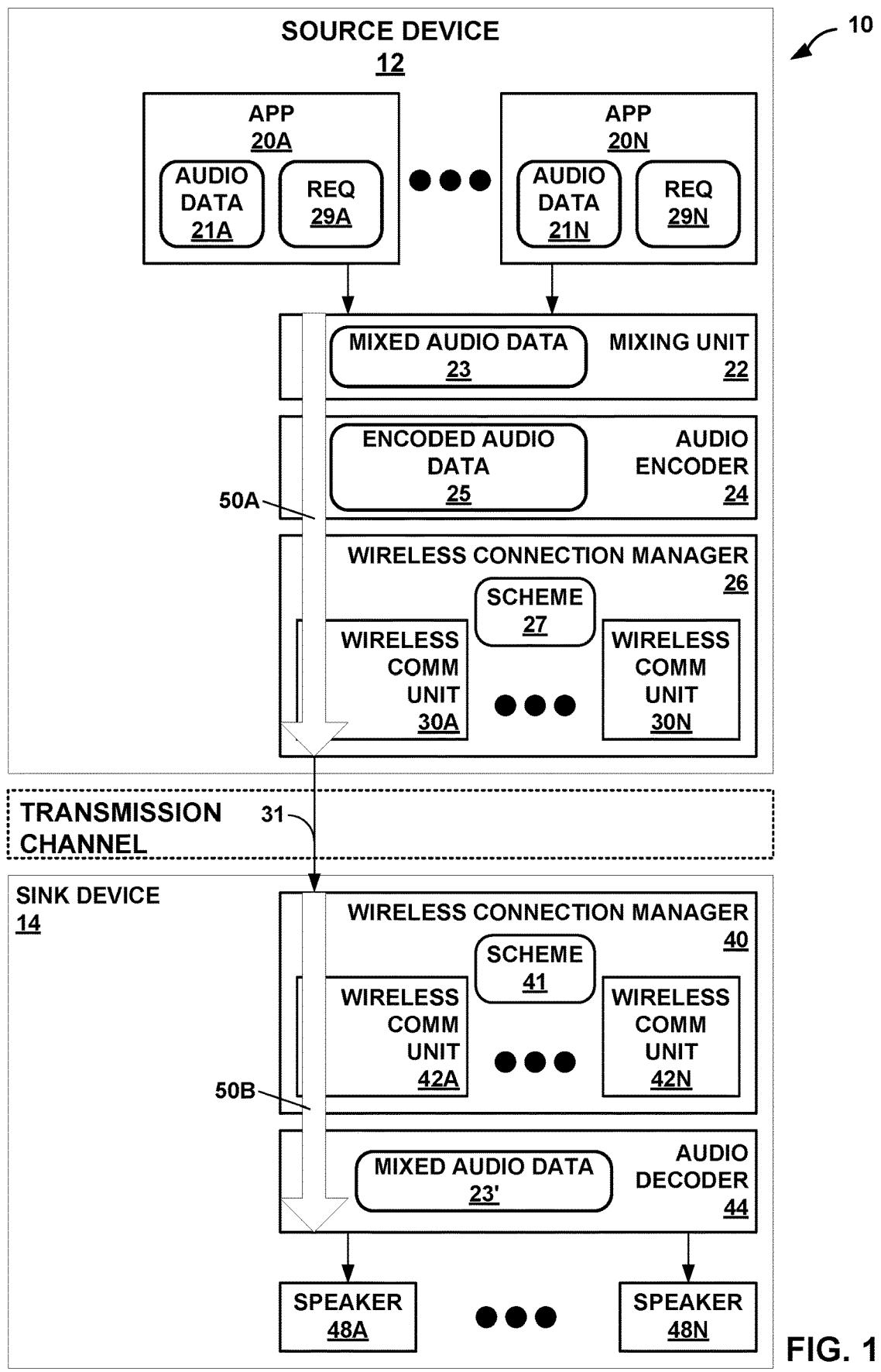
FIG. 1 is a block diagram illustrating a system that may perform various aspects of the techniques described in this disclosure.

FIG. 1 is a diagram illustrating a system 10 that may perform various aspects of the techniques described in this disclosure for perceptual audio coding. As shown in the example of FIG. 1, the system 10 includes a source device 12 and a sink device 14. Although described with respect to the source device 12 and the sink device 14, the source device 12 may operate, in some instances, as the sink device, and the sink device 14 may, in these and other instances, operate as the source device. As such, the example of system 10 shown in FIG. 1 is merely one example illustrative of various aspects of the techniques described in this disclosure.

In any event, the source device 12 may represent any form of computing device capable of implementing the techniques described in this disclosure, including a handset (or cellular phone), a tablet computer, a so-called smart phone, a remotely piloted aircraft (such as a so-called "drone"), a robot, a desktop computer, a receiver (such as an audio/visual—AV—receiver), a set-top box, a television (including so-called "smart televisions"), a media player (such as a digital video disc player, a streaming media player, a Blue-Ray Disc™ player, etc.), or any other device capable of communicating audio data wirelessly to a sink device via a personal area network (PAN). For purposes of illustration, the source device 12 is assumed to represent a smart phone.

The sink device 14 may represent any form of computing device capable of implementing the techniques described in this disclosure, including a handset (or cellular phone), a tablet computer, a smart phone, a desktop computer, a wireless headset (which may include wireless headphones that include or exclude a microphone, and so-called smart wireless headphones that include additional functionality such as fitness monitoring, on-board music storage and/or playback, dedicated cellular capabilities, etc.), a wireless speaker (including a so-called "smart speaker"), a watch (including so-called "smart watches"), or any other device capable of reproducing a soundfield based on audio data communicated wirelessly via the PAN. Also, for purposes of illustration, the sink device 14 is assumed to represent wireless headphones.

As shown in the example of FIG. 1, the source device 12 includes one or more applications ("apps") 20A-20N ("apps 20"), a mixing unit 22, an audio encoder 24, and a wireless connection manager 26. Although not shown in the example of FIG. 1, the source device 12 may include a number of other elements that support operation of apps 20, including an operating system, various hardware and/or software interfaces (such as user interfaces, including graphical user interfaces), one or more processors, memory, storage devices, and the like.

Each of the apps 20 represent software (such as a collection of instructions stored to a non-transitory computer readable media) that configure the system 10 to provide some functionality when executed by the one or more processors of the source device 12. The apps 20 may, to list a few examples, provide messaging functionality (such as access to emails, text messaging, and/or video messaging), voice calling functionality, video conferencing functionality, calendar functionality, audio streaming functionality, direction functionality, mapping functionality, gaming functionality. Apps 20 may be first party applications designed and developed by the same company that designs and sells the operating system executed by the source device 12 (and often pre-installed on the source device 12) or third-party applications accessible via a so-called "app store" or possibly pre-installed on the source device 12. Each of the apps 20, when executed, may output audio data 21A-21N ("audio data 21"), respectively. In some examples, the audio data 21 may be generated from a microphone (not pictured) connected to the source device 12.

The mixing unit 22 represents a unit configured to mix one or more of audio data 21A-21N ("audio data 21") output by the apps 20 (and other audio data output by the operating system—such as alerts or other tones, including keyboard press tones, ringtones, etc.) to generate mixed audio data 23. Audio mixing may refer to a process whereby multiple sounds (as set forth in the audio data 21) are combined into one or more channels. During mixing, the mixing unit 22 may also manipulate and/or enhance volume levels (which may also be referred to as "gain levels"), frequency content, and/or panoramic position of the audio data 21. In the context of streaming the audio data 21 over a wireless PAN session, the mixing unit 22 may output the mixed audio data 23 to the audio encoder 24.

The audio encoder 24 may represent a unit configured to encode the mixed audio data 23 and thereby obtain encoded audio data 25. In some examples, the audio encoder 24 may encode individual ones of the audio data 21. Referring for purposes of illustration to one example of the PAN protocols, Bluetooth® provides for a number of different types of audio codecs (which is a word resulting from combining the words "encoding" and "decoding") and is extensible to include vendor specific audio codecs. The Advanced Audio Distribution Profile (A2DP) of Bluetooth® indicates that support for A2DP requires supporting a sub-band codec specified in A2DP. A2DP also supports codecs set forth in MPEG-1 Part 3 (MP2), MPEG-2 Part 3 (MP3), MPEG-2 Part 7 (advanced audio coding—AAC), MPEG-4 Part 3 (high efficiency-AAC—HE-AAC), and Adaptive Transform Acoustic Coding (ATRAC). Furthermore, as noted above, A2DP of Bluetooth® supports vendor specific codecs, such as aptX™ and various other versions of aptX (e.g., enhanced aptX—E-aptX, aptX live, and aptX high definition—aptX-HD).

The audio encoder 24 may operate consistent with one or more of any of the above listed audio codecs, as well as, audio codecs not listed above, but that operate to encode the mixed audio data 23 to obtain the encoded audio data 25. The audio encoder 24 may output the encoded audio data 25 to one of the wireless communication units 30 (e.g., the wireless communication unit 30A) managed by the wireless connection manager 26. In accordance with example techniques of this disclosure that will be described in more detail below, the audio encoder 24 may be configured to encode the audio data 21 and/or the mixed audio data 23 using a cooperative pyramid vector quantization technique.

In accordance with aspects of this disclosure, the audio encoder 24 may be configured to use a multiplexer to implement tree-based rate control. That is, depending on a rate requested by the sink device 14 and based on available streaming bandwidth, the audio encoder 24 may invoke the multiplexer to switch between and traverse through finer and finer energy levels represented by branches of the tree. As used herein, the entire set of existing coarse-fine quantization operations forms a root node of the tree, and the root node is associated with a resolution depth of one (1) in the tree-based quantization scheme of this disclosure. Additional levels of fine-grained quantization that the multiplexer selects represent resolution depths of two (2), three (3), and so on, according to the tree-based quantization structure of this disclosure.

According to some examples of this disclosure, the audio encoder 24 may independently multiplex and select a particular tree-based quantization scheme on a per-sub-band basis. That is, in these instances, the audio encoder 24 quantizes the sub-bands according to target bitrates that are defined individually for each sub-band. As such, in these examples, the audio encoder 24 selects a respective hierarchical quantization mechanism selection for each respective sub-band independently of the quantization mechanism selection performed for any of the other sub-bands.

According to other examples of this disclosure, the audio encoder 24 may implement a single multiplexing-based selection for all sub-bands of the audio stream. In other words, in these instances, the audio encoder 24 quantizes each sub-band according to the same target bitrate. Said another way, according to these examples, the audio encoder 24 defines the target bitrate uniformly for all of the sub-bands.

The wireless connection manager 26 may represent a unit configured to allocate bandwidth within certain frequencies of the available spectrum to the different ones of the wireless communication units 30. For example, the Bluetooth® communication protocols operate over within the 2.5 GHz range of the spectrum, which overlaps with the range of the spectrum used by various WLAN communication protocols. The wireless connection manager 26 may allocate some portion of the bandwidth during a given time to the Bluetooth® protocol and different portions of the bandwidth during a different time to the overlapping WLAN protocols. The allocation of bandwidth and other is defined by a scheme 27. The wireless connection manager 40 may expose various application programmer interfaces (APIs) by which to adjust the allocation of bandwidth and other aspects of the communication protocols so as to achieve a specified quality of service (QoS). That is, the wireless connection manager 40 may provide the API to adjust the scheme 27 by which to control operation of the wireless communication units 30 to achieve the specified QoS.

In other words, the wireless connection manager 26 may manage coexistence of multiple wireless communication units 30 that operate within the same spectrum, such as certain WLAN communication protocols and some PAN protocols as discussed above. The wireless connection manager 26 may include a coexistence scheme 27 (shown in FIG. 1 as "scheme 27") that indicates when (e.g., an interval) and how many packets each of the wireless communication units 30 may send, the size of the packets sent, and the like.

The wireless communication units 30 may each represent a wireless communication unit 30 that operates in accordance with one or more communication protocols to communicate encoded audio data 25 via a transmission channel to the sink device 14. In the example of FIG. 1, the wireless communication unit 30A is assumed for purposes of illustration to operate in accordance with the Bluetooth® suite of communication protocols. It is further assumed that the wireless communication unit 30A operates in accordance with A2DP to establish a PAN link (over the transmission channel) to allow for delivery of the encoded audio data 25 from the source device 12 to the sink device 14.

More information concerning the Bluetooth® suite of communication protocols can be found in a document entitled "Bluetooth Core Specification v 5.0," published Dec. 6, 2016, and available at: www.bluetooth.org/en-us/specification/adopted-specifications. More information concerning A2DP can be found in a document entitled "Advanced Audio Distribution Profile Specification," version 1.3.1, published on Jul. 14, 2015.

The wireless communication unit 30A may output the encoded audio data 25 as a bitstream 31 to the sink device 14 via a transmission channel, which may be a wired or wireless channel, a data storage device, or the like. While shown in FIG. 1 as being directly transmitted to the sink device 14, the source device 12 may output the bitstream 31 to an intermediate device positioned between the source device 12 and the sink device 14. The intermediate device may store the bitstream 31 for later delivery to the sink device 14, which may request the bitstream 31. The intermediate device may comprise a file server, a web server, a desktop computer, a laptop computer, a tablet computer, a mobile phone, a smart phone, or any other device capable of storing the bitstream 31 for later retrieval by an audio decoder. This intermediate device may reside in a content delivery network capable of streaming the bitstream 31 (and possibly in conjunction with transmitting a corresponding video data bitstream) to subscribers, such as the sink device 14, requesting the bitstream 31.

Alternatively, the source device 12 may store the bitstream 31 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to those channels by which content stored to these mediums are transmitted (and may include retail stores and other store-based delivery mechanism). In any event, the techniques of this disclosure should not therefore be limited in this respect to the example of FIG. 1.

As further shown in the example of FIG. 1, the sink device 14 includes a wireless connection manager 40 that manages one or more of wireless communication units 42A-42N ("wireless communication units 42") according to a scheme 41, an audio decoder 44, and one or more speakers 48A-48N ("speakers 48"). The wireless connection manager 40 may operate in a manner similar to that described above with respect to the wireless connection manager 26, exposing an API to adjust scheme 41 by which operation of the wireless communication units 42 to achieve a specified QoS.

The wireless communication units 42 may be similar in operation to the wireless communication units 30, except that the wireless communication units 42 operate reciprocally to the wireless communication units 30 to decapsulate the encoded audio data 25. One of the wireless communication units 42 (e.g., the wireless communication unit 42A) is assumed to operate in accordance with the Bluetooth® suite of communication protocols and reciprocal to the wireless communication protocol 28A. The wireless communication unit 42A may output the encoded audio data 25 to the audio decoder 44.

The audio decoder 44 may operate in a manner that is reciprocal to the audio encoder 24. The audio decoder 44 may operate consistent with one or more of any of the above listed audio codecs, as well as, audio codecs not listed above, but that operate to decode the encoded audio data 25 to obtain mixed audio data 23'. The prime designation with respect to "mixed audio data 23" denotes that there may be some loss due to quantization or other lossy operations that occur during encoding by the audio encoder 24. The audio decoder 44 may output the mixed audio data 23' to one or more of the speakers 48.

Each of the speakers 48 represent a transducer configured to reproduce a soundfield from the mixed audio data 23'. The transducer may be integrated within the sink device 14 as shown in the example of FIG. 1 or may be communicatively coupled to the sink device 14 (via a wire or wirelessly). The speakers 48 may represent any form of speaker, such as a loudspeaker, a headphone speaker, or a speaker in an earbud. Furthermore, although described with respect to a transducer, the speakers 48 may represent other forms of speakers, such as the "speakers" used in bone conducting headphones that send vibrations to the upper jaw, which induces sound in the human aural system.

As noted above, the apps 20 may output audio data 21 to the mixing unit 22. Prior to outputting the audio data 21, the apps 20 may interface with the operating system to initialize an audio processing path for output via integrated speakers (not shown in the example of FIG. 1) or a physical connection (such as a mini-stereo audio jack, which is also known as 3.5 millimeter—mm—minijack). As such, the audio processing path may be referred to as a wired audio processing path considering that the integrated speaker is connected by a wired connection similar to that provided by the physical connection via the mini-stereo audio jack. The wired audio processing path may represent hardware or a combination of hardware and software that processes the audio data 21 to achieve a target quality of service (QoS).

To illustrate, one of the apps 20 (which is assumed to be the app 20A for purposes of illustration) may issue, when initializing or reinitializing the wired audio processing path, one or more request 29A for a particular QoS for the audio data 21A output by the app 20A. The request 29A may specify, as a couple of examples, a high latency (that results in high quality) wired audio processing path, a low latency (that may result in lower quality) wired audio processing path, or some intermediate latency wired audio processing path. The high latency wired audio processing path may also be referred to as a high quality wired audio processing path, while the low latency wired audio processing path may also be referred to as a low quality wired audio processing path.

Figure 2:
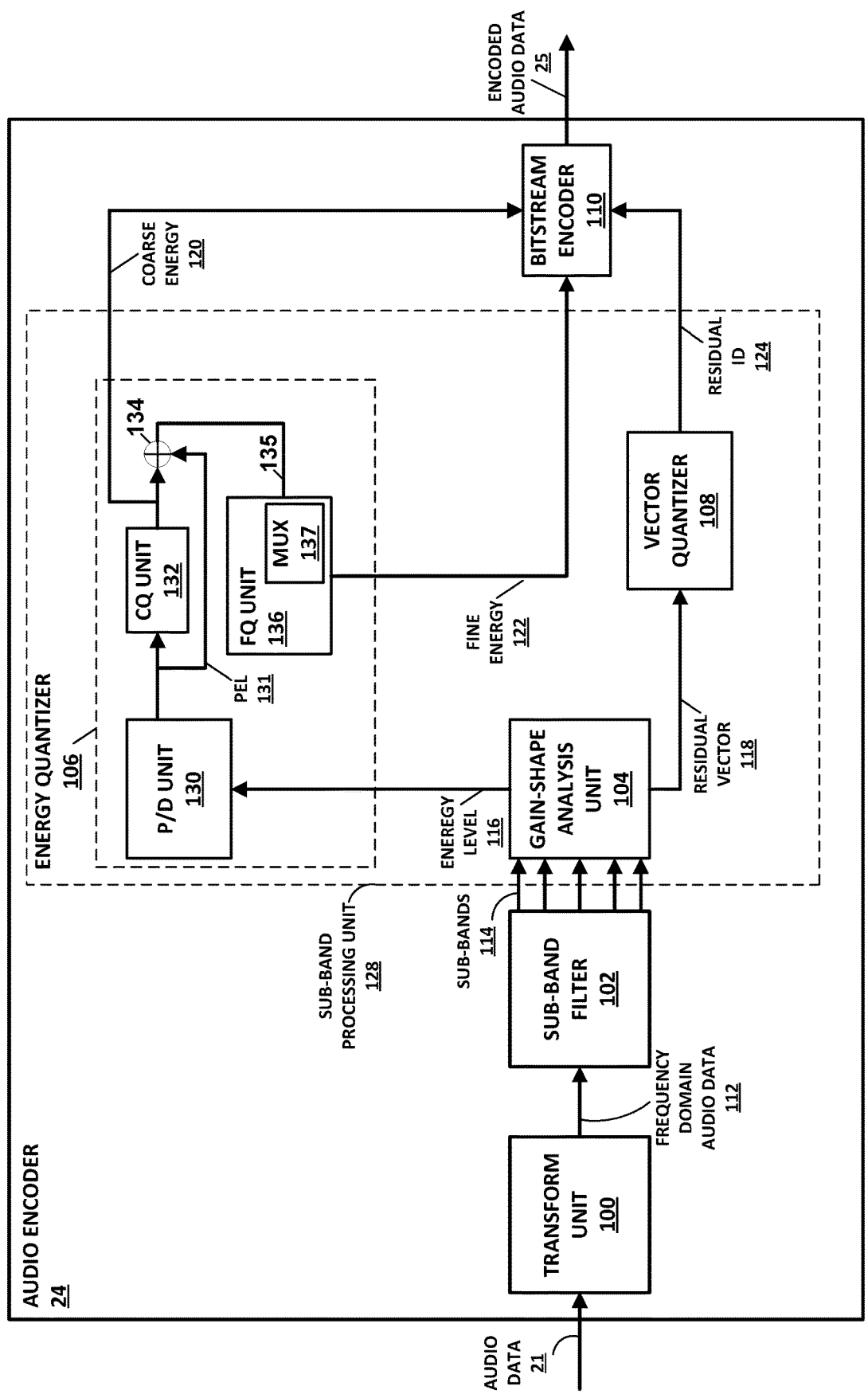
FIG. 2 is a block diagram illustrating an example audio encoder configured to perform various aspects of the techniques described in this disclosure.

FIG. 2 is a block diagram illustrating an example of an audio encoder 24 configured to perform various aspects of the techniques described in this disclosure. The audio encoder 24 may be configured to encode audio data for transmission over a PAN (e.g., Bluetooth®). However, the techniques of this disclosure performed by the audio encoder 24 may be used in any context where the compression of audio data is desired. In some examples, the audio encoder 24 may be configured to encode the audio data 21 in accordance with as aptX™ audio codec, including, e.g., enhanced aptX—E-aptX, aptX live, and aptX high definition. However, the techniques of this disclosure may be used in any audio codec. As will be explained in more detail below, the audio encoder 24 may be configured to perform various aspects of perceptual audio coding in accordance with various aspects of the techniques described in this disclosure.

In the example of FIG. 2, the audio encoder 24 may be configured to encode the audio data 21 (or the mixed audio data 23) using a gain-shape vector quantization encoding process. In a gain-shape vector quantization encoding process, the audio encoder 24 is configured to encode both a gain (e.g., an energy level) and a shape (e.g., a residual vector defined by transform coefficients) of a sub-band of frequency domain audio data. Each sub-band of frequency domain audio data represents a certain frequency range of a particular frame of the audio data 21. In general, throughout this disclosure, the term "sub-band" represents a frequency range, a band, or the like.

The audio data 21 may be sampled at a particular sampling frequency. Example sampling frequencies may include 48 kHz or 44.1 kHZ, though any desired sampling frequency may be used. Each digital sample of the audio data 21 may be defined by a particular input bit depth, e.g., 16 bits or 24 bits. In one example, the audio encoder 24 may be configured operate on a single channel of the audio data 21 (e.g., mono audio). In another example, the audio encoder 24 may be configured to independently encode two or more channels of the audio data 21. For example, the audio data 21 may include left and right channels for stereo audio. In this example, the audio encoder 24 may be configured to encode the left and right audio channels independently in a dual mono mode. In other examples, the audio encoder 24 may be configured to encode two or more channels of the audio data 21 together (e.g., in a joint stereo mode). For example, the audio encoder 24 may perform certain compression operations by predicting one channel of the audio data 21 based on another channel of the audio data 21.

Regardless of how the channels of the audio data 21 are arranged, the audio encoder 24 invokes a transform unit 100 to process the audio data 21. The transform unit 100 is configured to process the audio data 21 by, at least in part, applying a transform to a frame of the audio data 21 and thereby transform the audio data 21 from a time domain to a frequency domain to produce frequency domain audio data 112.

A frame of the audio data 21 may be represented by a predetermined number of samples of the audio data. In one example, a frame of the audio data 21 may be 1024 samples wide. Different frame widths may be chosen based on the frequency transform being used and the amount of compression desired. The frequency domain audio data 112 may be represented as transform coefficients, where the value of each the transform coefficients represents an energy of the frequency domain audio data 112 at a particular frequency.

In one example, the transform unit 100 may be configured to transform the audio data 21 into the frequency domain audio data 112 using a modified discrete cosine transform (MDCT). An MDCT is a "lapped" transform that is based on a type-IV discrete cosine transform. The MDCT is considered "lapped" as it works on data from multiple frames. That is, in order to perform the transform using an MDCT, transform unit 100 may include a fifty percent overlap window into a subsequent frame of audio data. The overlapped nature of an MDCT may be useful for data compression techniques, such as audio encoding, as it may reduce artifacts from coding at frame boundaries. The transform unit 100 need not be constrained to using an MDCT but may use other frequency domain transformation techniques for transforming the audio data 21 into the frequency domain audio data 112.

A sub-band filter 102 separates the frequency domain audio data 112 into sub-bands 114. Each of the sub-bands 114 includes transform coefficients of the frequency domain audio data 112 in a particular frequency range. For instance, the sub-band filter 102 may separate the frequency domain audio data 112 into twenty different sub-bands. In some examples, sub-band filter 102 may be configured to separate the frequency domain audio data 112 into sub-bands 114 of uniform frequency ranges. In other examples, sub-band filter 102 may be configured to separate the frequency domain audio data 112 into sub-bands 114 of non-uniform frequency ranges.

For example, sub-band filter 102 may be configured to separate the frequency domain audio data 112 into sub-bands 114 according to the Bark scale. In general, the sub-bands of a Bark scale have frequency ranges that are perceptually equal distances. That is, the sub-bands of the Bark scale are not equal in terms of frequency range, but rather, are equal in terms of human aural perception. In general, sub-bands at the lower frequencies will have fewer transform coefficients, as lower frequencies are easier to perceive by the human aural system.

As such, the frequency domain audio data 112 in lower frequency sub-bands of the sub-bands 114 is less compressed by the audio encoder 24, as compared to higher frequency sub-bands. Likewise, higher frequency sub-bands of the sub-bands 114 may include more transform coefficients, as higher frequencies are harder to perceive by the human aural system. As such, the frequency domain audio 112 in data in higher frequency sub-bands of the sub-bands 114 may be more compressed by the audio encoder 24, as compared to lower frequency sub-bands.

The audio encoder 24 may be configured to process each of sub-bands 114 using a sub-band processing unit 128. That is, the sub-band processing unit 128 may be configured to process each of sub-bands separately. The sub-band processing unit 128 may be configured to perform a gain-shape vector quantization process.

A gain-shape analysis unit 104 may receive the sub-bands 114 as an input. For each of sub-bands 114, the gain-shape analysis unit 104 may determine an energy level 116 of each of the sub-bands 114. That is, each of sub-bands 114 has an associated energy level 116. The energy level 116 is a scalar value in units of decibels (dBs) that represents the total amount of energy (also called gain) in the transform coefficients of a particular one of sub-bands 114. The gain-shape analysis unit 104 may separate energy level 116 for one of sub-bands 114 from the transform coefficients of the sub-bands to produce residual vector 118. The residual vector 118 represents the so-called "shape" of the sub-band. The shape of the sub-band may also be referred to as the spectrum of the sub-band.

A vector quantizer 108 may be configured to quantize the residual vector 118. In one example, the vector quantizer 108 may quantize the residual vector using a pyramid vector quantization (PVQ) process to produce the residual ID 124. Instead of quantizing each sample separately (e.g., scalar quantization), the vector quantizer 108 may be configured to quantize a block of samples included in the residual vector 118 (e.g., a shape vector). In some examples, the vector quantizer 108 may use a Linde-Buzo-Gray (LBG) algorithm to perform the vector quantization. A Linde-Buzo-Gray (LBG) algorithm typically results in less distortion with a fixed available bit-rate compared to scalar quantization. However, any vector quantization processes can be used along with the perceptual audio coding techniques of this disclosure.

For example, the vector quantizer 108 may use structured vector quantization algorithms reduce storage and computational complexity LGB algorithms. A structured vector quantization may involve performing the quantization based upon a set of structured code-vectors that do not need to be stored explicitly and can be identified functionally. Examples of the structured vector quantizers include Lattice vector quantizers and Pyramid Vector Quantizers (PVQ) as introduced in T. Fischer, "A pyramid vector quantizer," in *IEEE Transactions on Information Theory*, vol. 32, no. 4, pp. 568-583, July 1986. One example of how PVQ may be used is described in A. C. Hung, E. K. Tsern and T. H. Meng, "Error-resilient pyramid vector quantization for image compression," in *IEEE Transactions on Image Processing*, vol. 7, no. 10, pp. 1373-1386, October 1998.

Using PVQ, the vector quantizer 108 may be configured to map the residual vector 118 to a hyperpyramid (with constant L1 norm) or a hypersphere (with constant L2 norm) and quantize the residual vector 118 upon the underlying structured codebook. The quantization code-vectors are then enumerated and assigned an ID (e.g., the residual ID 124) to be encoded and transmitted. The quality of the mapping drives the accuracy of the quantization, while the number of enumeration code-vectors specifies the shape transmission rate.

In some examples, the audio encoder 24 may dynamically allocate bits for coding the energy level 116 and the residual vector 118. That is, for each of sub-bands 114, the audio encoder 24 may determine the number of bits allocated for energy quantization (e.g., by an energy quantizer 106) and the number of bits allocated for vector quantization (e.g., by the vector quantizer 108). The total number of bits allocated for energy quantization may be referred to as energy-assigned bits. These energy-assigned bits may then be allocated between a coarse quantization process and a fine quantization process.

An energy quantizer 106 may receive the energy level 116 of the sub-bands 114 and quantize the energy level 116 of the sub-bands 114 into a coarse energy 120 and a fine energy 122. This disclosure will describe the quantization process for one sub-band, but it should be understood that the energy quantizer 106 may perform energy quantization on one or more of the sub-bands 114, including each of the sub-bands 114.

As shown in the example of FIG. 2, the energy quantizer 106 may include a prediction/difference ("P/D") unit 130, a coarse quantization ("CQ") unit 132, a summation unit 134, and a fine quantization ("FQ") unit 136. The P/D unit 130 may predict or otherwise identify a difference between energy levels 116 for one of the sub-bands 114 and another one of the sub-bands 114 of the same frame of audio data (which may refer to spatial—in the frequency domain—prediction) or a same (or possibly a different) one of the sub-bands 114 from a different frame (which may be referred to as temporal prediction). The P/D unit 130 may analyze the energy levels 116 in this manner to obtain predicted energy levels 131 ("PEL 131") for each of the sub-bands 114. The P/D unit 130 may output the predicted energy levels 131 to the coarse quantization unit 132.

The coarse quantization unit 132 may represent a unit configured to perform coarse quantization with respect to the predicted energy levels 131 to obtain the coarse energy 120. The coarse quantization unit 132 may output the coarse energy 120 to the bitstream encoder 110 and the summation unit 134. The summation unit 134 may represent a unit configured to obtain a difference of the coarse quantization unit 134 and the predicted energy level 131. The summation unit 134 may output the difference as error 135 to the fine quantization unit 135.

The fine quantization unit 132 may represent a unit configured to perform fine quantization with respect to the error 135. The fine quantization may be considered "fine" relative to the coarse quantization performed by the coarse quantization unit 132. That is, the fine quantization unit 132 may quantize according to a step size having a higher resolution than the step size used when performing the coarse quantization, thereby further quantizing the error 135. The fine quantization unit 136 may obtain a fine energy 122 for each for the sub-bands 122 as a result of performing the fine quantization with respect to the error 135. The fine quantization unit 136 may output the fine energy 122 to the bitstream encoder 110.

In general, the energy quantizer 106 may perform a multi-step quantization process. The energy quantizer 106 may first quantize the energy level 116 with a first number of bits for a coarse quantization process to generate the coarse energy 120. The energy quantizer 106 may generate the coarse energy using a predetermined range of energy levels for the quantization (e.g., the range defined by a maximum and a minimum energy level. The coarse energy 120 approximates the value of the energy level 116.

The energy quantizer 106 may then determine a difference between the coarse energy 120 and the energy level 116. This difference is sometimes called a quantization error. The energy quantizer 106 may then quantize the quantization error using a second number of bits in a fine quantization process to produce the fine energy 122. The number of bits used for the fine quantization bits is determined by the total number of energy-assigned bits minus the number of bits used for the coarse quantization process. When added together, the coarse energy 120 and the fine energy 122 represent a total quantized value of the energy level 116.

The audio encoder 24 may be further configured to encode the coarse energy 120, the fine energy 122, and the residual ID 124 using a bitstream encoder 110 to create the encoded audio data 25. The bitstream encoder 110 may be configured to further compress the coarse energy 120, the fine energy 122, and the residual ID 124 using one or more entropy encoding processes. Entropy encoding processes may include Huffman coding, arithmetic coding, context-adaptive binary arithmetic coding (CABAC), and other similar encoding techniques. The encoded audio data 25 may then be transmitted to the sink device 14 and/or stored in a memory for later use, as noted above.

The energy quantizer 106 (and/or components thereof, such as the fine quantization unit 136) may, in accordance with aspects of this disclosure, implement a hierarchical rate control mechanism to provide a greater degree of scalability and to achieve a seamless or substantially seamless real-time streaming. For instance, the fine quantization unit 136 may implement a hierarchical fine quantization scheme according to aspects of this disclosure. In some examples, the fine quantization unit 136 invokes a multiplexer (or "MUX") 137 to implement selection operations of the hierarchical rate control techniques of this disclosure.

At various points of the remainder of this disclosure, the term "coarse quantization" refers to the combined operations of the two-step coarse-fine quantization techniques described above. In accordance with various aspects of this disclosure, the fine quantization unit 136 may perform one or more additional iterations of fine quantization with respect to the error 135 received from the summation unit 134. In accordance with the hierarchical rate techniques of this disclosure, fine quantization unit 136 uses the multiplexer 137 to switch between and traverse various fine(r) energy levels.

The hierarchical rate control mechanisms of this disclosure may be described as a tree-based fine quantization structure or a cascaded fine quantization structure. When viewed as a tree-based structure, the existing two-step quantization operation forms a root node of the tree, and the root node is described as having a resolution depth of one (1). Depending on availability of bits for further fine quantization in accordance with the techniques of this disclosure, the multiplexer 137 may select additional level(s) of fine-grained quantization. Any such subsequent fine quantization levels selected by the multiplexer 137 represent resolution depths of two (2), three (3), and so on, with respect to the tree-based structure that represents the multiple-level fine quantization techniques of this disclosure.

By implementing the hierarchical rate control techniques of this disclosure, the fine quantization unit 136 may provide improved scalability and control with respect to seamless real-time streaming scenarios in a wireless PAN. For instance, the techniques of this disclosure enable the fine quantization unit 136 to replicate the hierarchical fine quantization scheme and quantization multiplexing tree at higher level hierarchies, seeded at coarse quantization points of a more general decision tree. Moreover, the fine quantization unit 136 may enable the audio encoder 24 to achieve seamless or substantially seamless real-time compression and streaming navigation. For instance, the fine quantization unit 136 may perform a multiple-root hierarchical decision structure with respect to multiple-level fine quantization, thereby enabling the energy quantizer 106 to utilize the total available bits to implement potentially several iterations of fine quantization.

The fine quantization unit 136 may implement the hierarchical rate control techniques described herein in a variety of ways, in accordance with different aspects of this disclosure. In some examples consistent with the techniques of this disclosure, the fine quantization unit 136 may invoke the multiplexer 137 on a per-sub-band basis to independently multiplex (and thereby select a respective tree-based quantization scheme) for error 135 information pertaining to each one of the sub-bands 114. That is, in these examples, the fine quantization unit 136 performs a multiplexing-based hierarchical quantization mechanism selection for each respective sub-band 114 independently of the quantization mechanism selection for any other ones of sub-bands 114. In these examples, the fine quantization unit 136 quantizes each of sub-bands 114 according to a target bitrate specified with respect to the respective sub-band 114 only. In these examples, the audio encoder 24 may signal, as part of the encoded audio data 25, details of the particular hierarchical quantization scheme for each of the sub-bands 114.

In other examples consistent with the techniques of this disclosure, the fine quantization unit 136 may invoke the multiplexer 137 just once, and thereby select a single multiplexing-based quantization scheme for the error 135 information pertaining to all of sub-bands 114. That is, in these examples, the fine quantization unit 136 quantizes the error 135 information pertaining to all of sub-bands 114 according to the same target bitrate, which is selected a single time and defined uniformly for all of the sub-bands 114. In these examples, the audio encoder 24 may signal, as part of the encoded audio data 25, details of the single hierarchical quantization scheme applied across all of the sub-bands 114.

Figure 3:
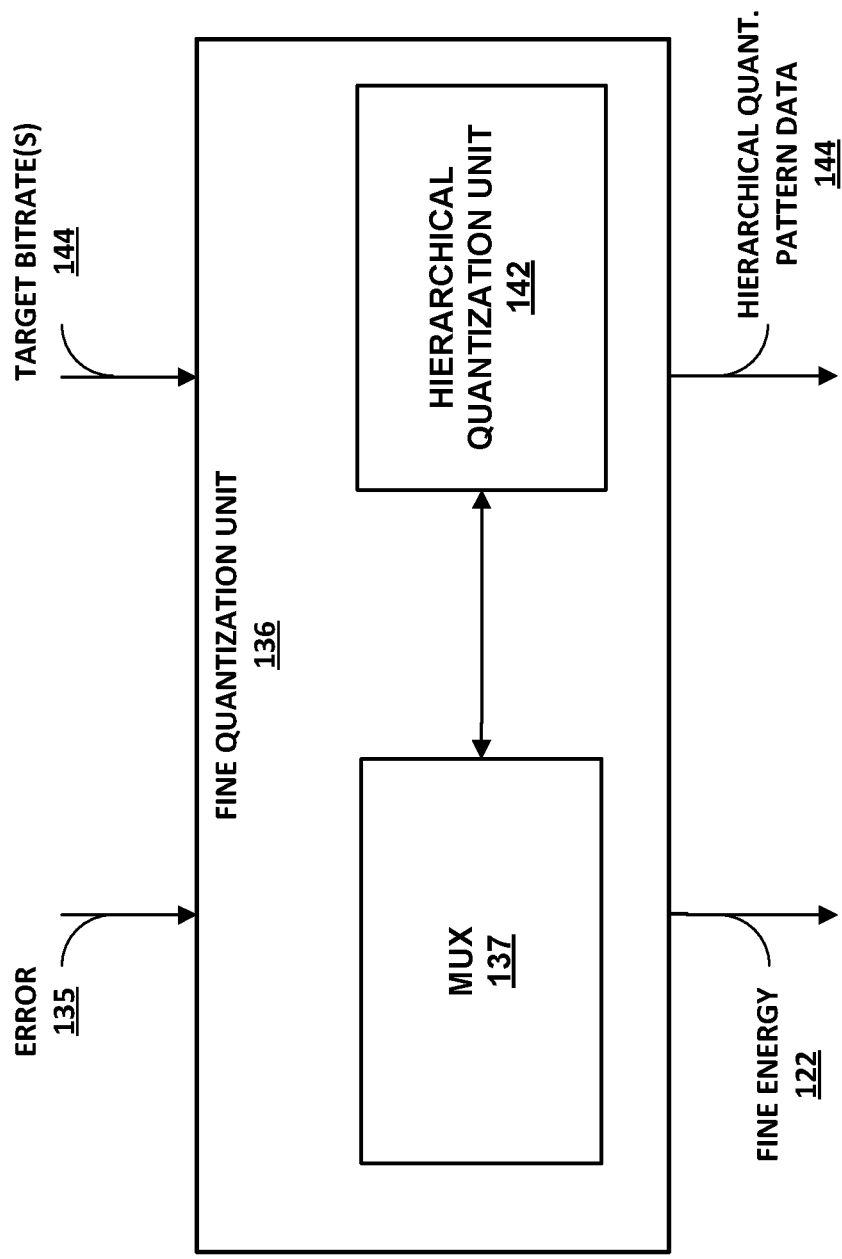
FIG. 3 is a block diagram illustrating an example vector quantizer configured to perform various aspects of the techniques described in this disclosure.

FIG. 3 is a block diagram illustrating an example implementation of the fine quantization unit 136 illustrated in FIG. 2 and described above. The fine quantization unit 136 (and/or components thereof) may include, be, or be part of, devices/components comprising one or more digital signal processors (DSPs), general purpose microprocessors, application specific integrated circuits (ASICs), field programmable logic arrays (FPGAs), processing circuitry (including fixed function circuitry and/or programmable processing circuitry), or other equivalent integrated circuits or discrete logic circuitry. In the example illustrated in FIG. 3, the fine quantization unit 136 includes the multiplexer 137 shown in FIG. 2 as well as a hierarchical quantization unit 142 in communication with the multiplexer 137.

As shown in FIG. 3, the fine quantization unit 136 receives one or more target bitrates 144, in addition to the error 135. The target bitrates 144 may, in various examples consistent with the aspects of this disclosure, represent either a single bitrate for error 135 across all of sub-bands 114, or may represent individual bitrates for error 135 on a per-sub-band basis among sub-bands 114. In either case, the hierarchical quantization unit 142 may iteratively apply one or more layers of fine quantization to the error 135, in accordance with aspects of this disclosure. That is, the multiplexer 137 may use the individual bitrates of target bitrates 144 to reach individual decisions with respect to each of sub-bands 114, or may use the single bitrate of target bitrates 144 to reach a single consolidated decision with respect to the entirety of sub-bands 114.

In turn, the hierarchical quantization unit 142 may obtain one or more tree-traversal decisions from the multiplexer 137. That is, the hierarchical quantization unit 142 may either receive a single decision from the multiplexer 137 that is applicable to all of the sub-bands 114, or may receive a respective individual decision with respect to each of the sub-bands 114, depending on whether multiplexer 137 bases the tree-traversal decision on per-sub-band bitrates or a single all-sub-band bitrate represented by target bitrates 144. Based on the tree-traversal decision information received from the multiplexer 137, the hierarchical quantization unit 142 may implement additional fine quantization to the error 135, beyond the fine quantization of the two-step coarse-fine quantization of the existing quantization techniques.

According to the techniques of this disclosure, the hierarchical quantization unit 142 may apply the additional fine quantization iteratively, as one or more additional layers of fine quantization. More specifically, the multiplexer 137 may form tree-traversal decisions that reflect varying depths (or "resolution depths") based on a number of bits available to the fine quantization unit 136 to perform additional fine (or "finer") quantization of the error 135. The hierarchical quantization unit 142 may apply the additional level(s) of fine quantization in a number of iterations that matches the integer representing the resolution depth of the tree traversal decision(s) received from the multiplexer 137.

Based on the tree-traversal pattern(s) output by the multiplexer 137, the fine quantization unit 136 may output hierarchical quantization pattern data 144. The hierarchical quantization pattern data 144 may reflect the resolution depth and other tree-traversal information for a single tree-traversal pattern applicable to all of the sub-bands 114, or may reflect separate tree-traversal patterns, each applicable to a respective one of the sub-bands 114, depending on whether the multiplexer 137 determined the tree-traversal patterns holistically or individually with respect to the sub-bands 114. In either case, the audio encoder 22 may include the hierarchical quantization pattern data 144 in the encoded audio 25 signaled to an audio decoding device.

Figure 4:
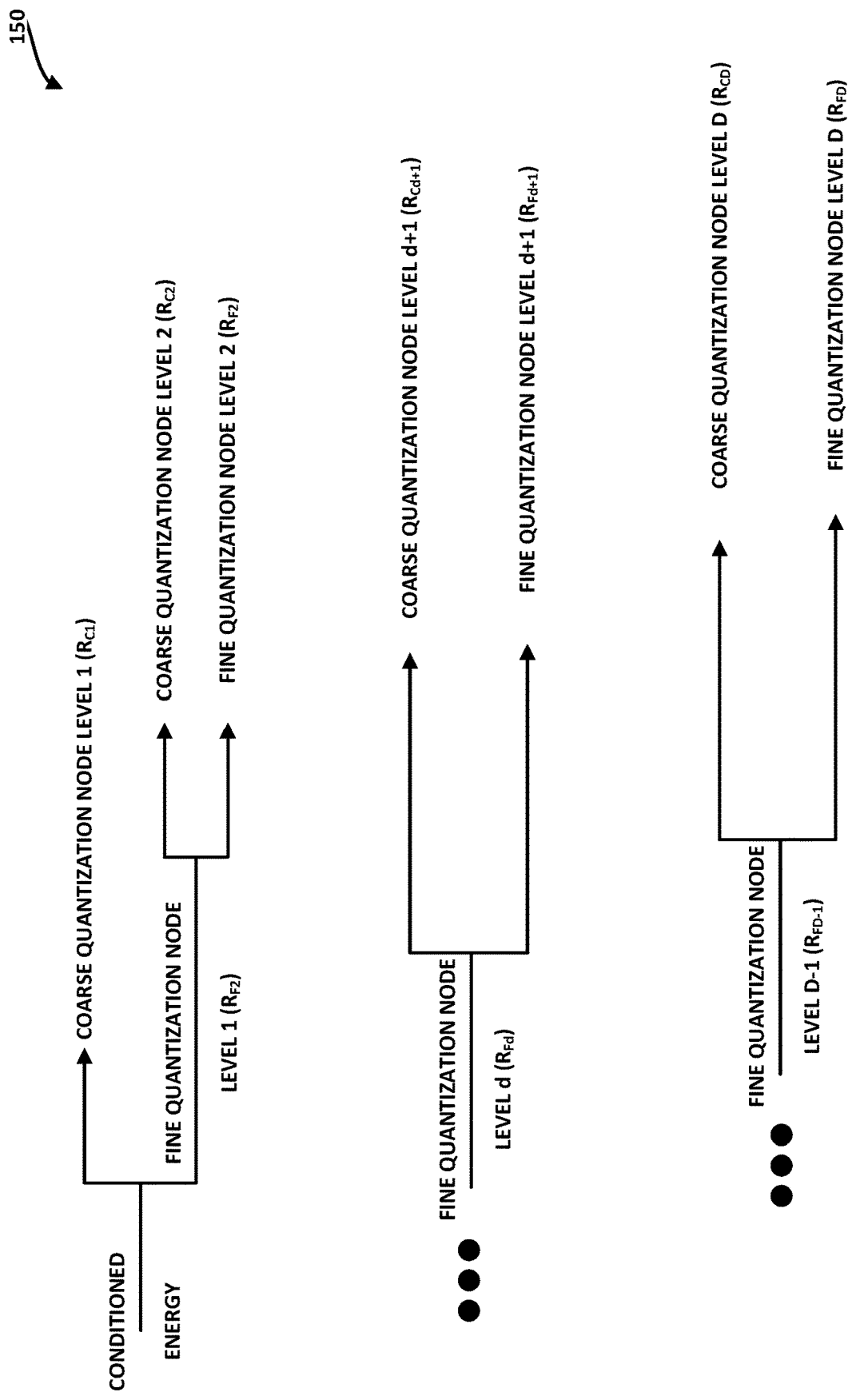
FIG. 4 is a diagram illustrating a tree-structured representation of the hierarchical quantization techniques of this disclosure.

FIG. 4 is a diagram illustrating a tree-structured representation of the hierarchical quantization techniques of this disclosure. The fine quantization unit 136 may implement the tree-based quantization structure 150 of FIG. 4 to provide a seamless or substantially seamless audio data compression control system to meet adaptation requirements with respect to varying devices being deployed across a wireless PAN. As shown in FIG. 4, the fine quantization unit 136 is configured to extend the uniform audio energy quantization system of existing technology to instead follow the tree-based quantization structure 150 to perform the hierarchical rate control of this disclosure.

The hierarchical rate control techniques represented by the tree-based quantization structure 150 branches out multiple compression levels based on a nominal compression ratio or streaming rate. Using the tree-based quantization structure 150 of FIG. 4, the fine quantization unit 136 may enable the audio encoder 24 to seamlessly transition between higher and lower compression levels without introducing coding artifacts. Using the requested rate (shown as the target bitrate(s) 144 in FIG. 3) and based on the streaming bandwidth available to audio encoder 24, the multiplexer 137 switches and traverses through the various tree branches and sub-branches illustrated in the tree-based quantization structure 150 shown in FIG. 4.

In some examples, the audio encoder 24 may signal data (e.g., one or more syntax elements) in the encoded audio data 25 to indicate that the error 135 was hierarchically fine quantized. In some examples, the audio encoder 24 may signal data (e.g., one or more syntax elements) in the encoded audio data 25 to indicate whether the hierarchical quantization structure applies to all of the sub-bands 114 with respect to error 135, or an individually-determined quantization structure was applied on a per-sub-band basis among the sub-bands 114 with respect to error 135.

As described herein, various "fine" quantization levels represent coarse quantization portions of traversing the tree-based quantization structure 150. More specifically, in the case of the tree-based quantization structure 150, and in accordance with the terminology used herein, only the fine quantization node at level $R_{FD}$ represents true "fine" quantization, because the fine quantization node at level $R_{FD}$ is a leaf node at which the hierarchical quantization unit 142 applies fine quantization operations. The remaining fine quantization nodes, in the context of the particular example of the tree-based quantization structure 150, represent "coarse" portions of the hierarchical quantization process, because the remaining fine quantization nodes are not leaf nodes in the tree structure determined by the multiplexer 137 based on the target bitrate(s) 144.

As used herein, the term "nominal compression ratio" is a compression point (selected from all possible compression points of the hierarchical compression schemes of this disclosure) that represents a default compression ratio. In some examples, the audio encoder 24 may select the nominal compression ratio at a time of system initialization. In some examples, the audio encoder 24 may select the nominal compression ratio as a default option if the audio encoder 24 determines that the bit-depth compression ratio is as-yet undecided or undetermined. In any event, the nominal compression ratio represents a fixed compression ratio, and various extensions thereof may represent compression points in the hierarchical quantization structures of this disclosure.

In various contexts in accordance with aspects of this disclosure, the term "streaming rate" represents a dynamic bitrate that the audio encoder 24 may provide, once the audio encoder 24 determines a compression ratio. Upon performing audio data compression according to the selected compression ratio, done, the audio encoder 24 may determine the streaming rate as a number of bits per second to deliver to the communication channel (e.g., Bluetooth®, WiFi, etc.) As such, the streaming rate is time-variant, subject to changes to the compression ratio, in accordance with the hierarchical quantization techniques of this disclosure. As an example, the audio encoder 24 may determine a nominal streaming rate or nominal bitrate (e.g., default streaming rate or bitrate) that corresponds to the nominal compression ratio described above.

Figure 5:
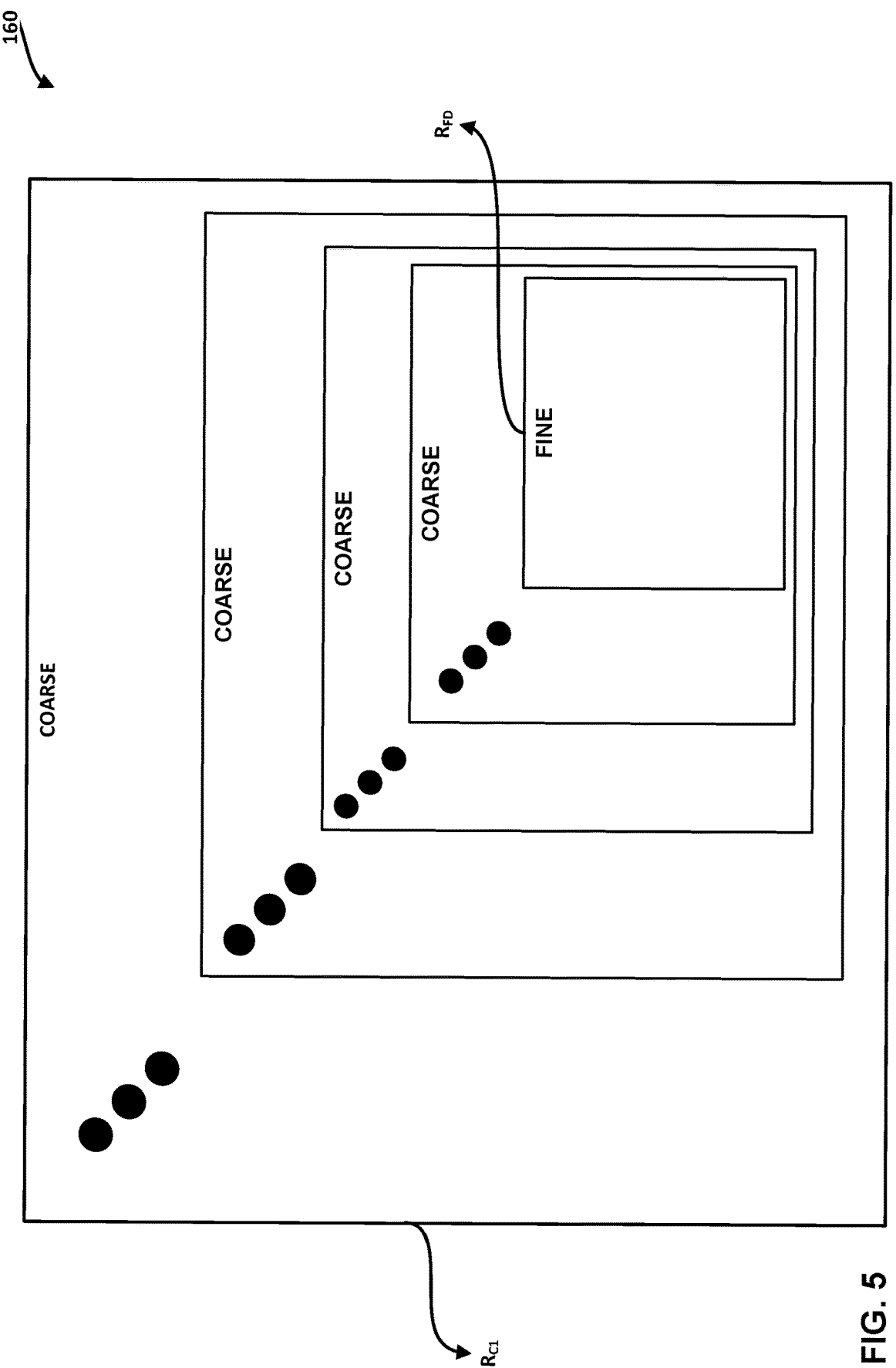
FIG. 5 is a diagram illustrating a cascaded (or "waterfall") representation of the hierarchical quantization techniques of this disclosure.

FIG. 5 is a diagram illustrating a cascaded (or "waterfall") representation of the hierarchical quantization techniques of this disclosure. The fine quantization unit 136 may implement the cascaded quantization structure 160 of FIG. 5 to provide a seamless or substantially seamless audio data compression control system to meet adaptation requirements with respect to varying devices being deployed across a wireless PAN. As shown in FIG. 5, the fine quantization unit 136 is configured to extend the uniform audio energy quantization system of existing technology to instead follow the cascaded quantization structure 160 to perform the hierarchical rate control of this disclosure.

Using the cascaded quantization structure 160 of FIG. 5, the fine quantization unit 136 may enable the audio encoder 24 to seamlessly transition between higher and lower compression levels without introducing coding artifacts. Using the requested rate (shown as the target bitrate(s) 144 in FIG. 3) and based on the streaming bandwidth available to audio encoder 24, the multiplexer 137 switches and traverses through the various waterfall levels illustrated in the cascaded quantization structure 160 shown in FIG. 5.

In some examples, the audio encoder 24 may signal data (e.g., one or more syntax elements) in the encoded audio data 25 to indicate that the error 135 was hierarchically fine quantized. In some examples, the audio encoder 24 may signal data (e.g., one or more syntax elements) in the encoded audio data 25 to indicate whether the hierarchical quantization structure applies to all of the sub-bands 114 with respect to error 135, or an individually-determined quantization structure was applied on a per-sub-band basis among the sub-bands 114 with respect to error 135.

In the case of the cascaded quantization structure 160, and in accordance with the terminology used herein, only the quantization operations at level $R_{FD}$ represents "fine" quantization, because the fine quantization node at level $R_{FD}$ is at the innermost level of the waterfall hierarchy of the cascaded quantization structure 160. The remaining quantization levels, in spite of involving operations performed by the fine quantization unit 136, represent "coarse" portions of the hierarchical quantization process of this disclosure, because the remaining quantization levels are subject to additional fine quantization operations based on the cascaded structure determined by the multiplexer 137 based on the target bitrate(s) 144.

Figure 6:
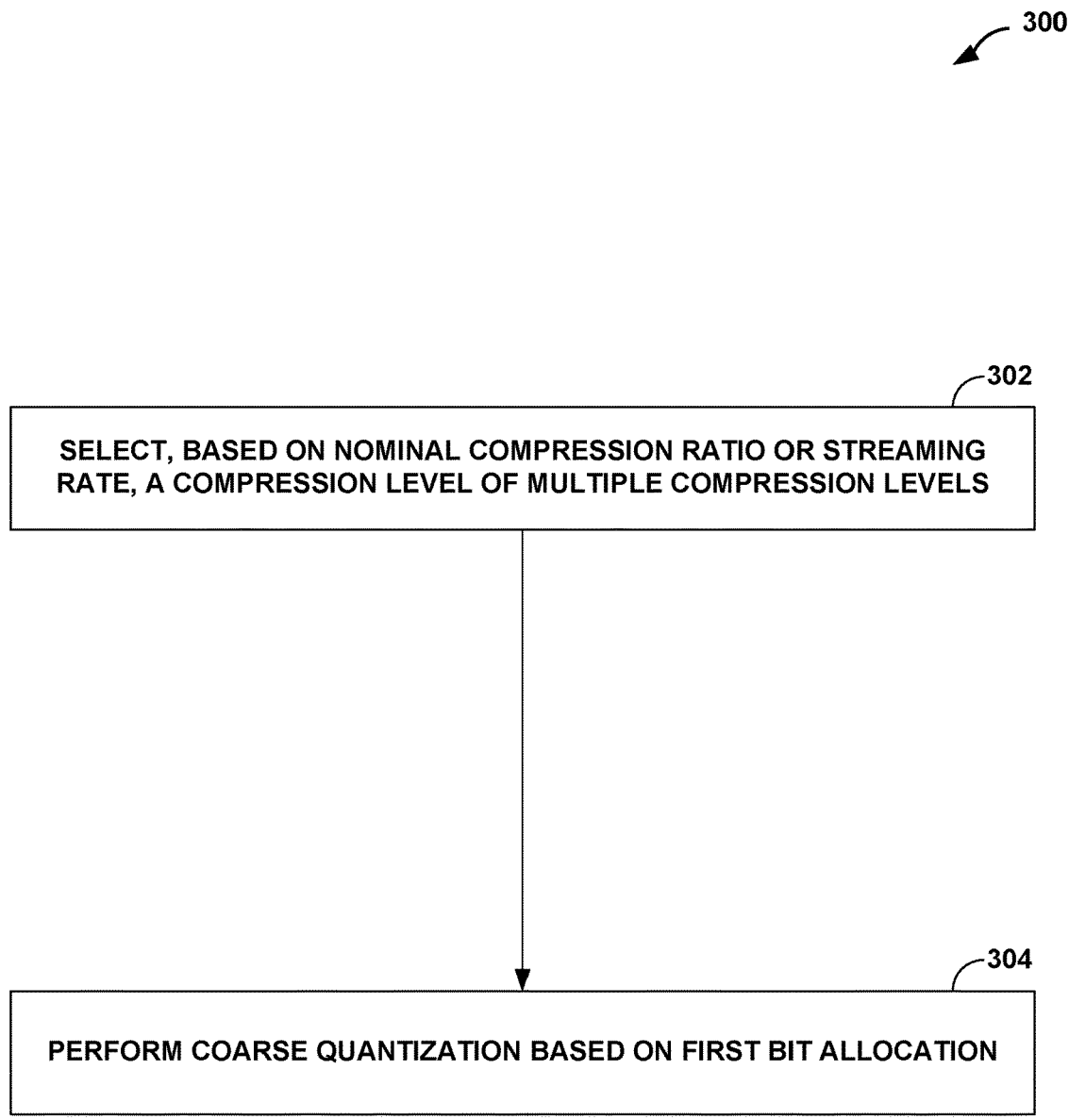
FIG. 6 is a flowchart illustrating a process that represents an example operation of the source device of FIG. 1 in performing various aspects of the techniques described in this disclosure.

FIG. 6 is a flowchart illustrating a process 300 that represents an example operation of the source device 12 of FIG. 1 (and/or components thereof, such as processor(s) or processing circuitry, such as fixed function circuitry and/or programmable processing circuitry, thereof) in performing various aspects of the techniques described in this disclosure. The process 300 may begin when the source device 12 selects, based on a nominal compression ratio or a streaming rate, a compression level of multiple compression levels (302). For instance, the multiple compression levels may be arranged hierarchically to allow for dynamic transitioning between the compression levels. In various examples, the audio data may be stored locally to a data storage component (e.g., a memory) of the source device 12, or the source device 12 may access the audio data from a remote storage location via a communicative connection (e.g., wired, wireless, etc.).

The source device 12 may encode, based on the selected compression level of the multiple compression levels, the stored audio data (304). In various examples, the selected compression level represents a higher compression level, and the source device 12 transitions the encoding of the audio data between the higher compression level and a lower compression level of the multiple compression levels. In some examples, the source device 12 performs coarse quantization with respect to the stored audio data to obtain an error, and performs, to achieve a target bitrate, hierarchical fine quantization with respect to the error. In some examples, the source device 12 determines the target bitrate based on an available streaming bandwidth, and multiplexes, based on the available streaming bandwidth, between multiple fine energy levels associated with the hierarchical fine quantization.

In some examples, the source device 12 may apply a sub-band filter to the stored audio data to obtain a plurality of sub-bands of the audio data, and may use a hierarchical fine quantization structure to perform hierarchical fine quantization with respect to respective errors associated with each respective sub-band of the plurality of sub-bands. In some examples, the source device 12 may apply a sub-band filter to the stored audio data to obtain a plurality of sub-bands of the audio data, and may perform the hierarchical fine quantization with respect to each respective sub-band of the plurality of sub-bands based on a respective hierarchical fine quantization structure determined individually with respect to each respective sub-band of the plurality of sub-bands.

In some examples, the source device 12 may apply a sub-band filter to the stored audio data to obtain a plurality of sub-bands of the audio data, and may determine an energy level of a sub-band of the obtained plurality of sub-bands of the audio data. In some examples, the source device 12 performs a gain-shape analysis with respect to the sub-band to determine the energy level, and performs the hierarchical fine quantization with respect to the energy level of the sub-band. In some examples, the source device 12 performs the gain-shape analysis by performing pyramid vector quantization.

In some examples, the source device 12 may outputs a bitstream via a wireless connection in accordance with a wireless communication protocol. In some examples, the wireless communication protocol may include, be, or be part of, a personal area network wireless communication protocol. For instance, the personal area network wireless communication protocol may include, be, or be part of, a Bluetooth® wireless communication protocol.

In some examples, the source device 12 may receive the audio data from a microphone. In some examples, the source device 12 may include a microphone configured to capture the audio data. In some examples, the source device 12 may apply a filter to the stored audio data to obtain a plurality of bands of the audio data. In various examples, the source device 12 may receive target bitrate information, and may apply the target bitrate information in determining characteristics of a hierarchical fine quantization structure, whether the structure is the same sub-band-wide or is determined individually on a per-sub-band basis.

As used herein, the term "nominal compression ratio" is a compression point (selected from all possible compression points of the hierarchical compression schemes of this disclosure) that represents a default compression ratio. In some examples, the source device 12 may select the nominal compression ratio at a time of system initialization. In some examples, the source device 12 may select the nominal compression ratio as a default option if the source device 12 determines that the bit-depth compression ratio is as-yet undecided or undetermined. In any event, the nominal compression ratio represents a fixed compression ratio, and various extensions thereof may represent compression points in the hierarchical quantization structures of this disclosure.

In various contexts in accordance with aspects of this disclosure, the term "streaming rate" represents a dynamic bitrate that the source device 12 may provide, once the source device 12 determines a compression ratio. Upon performing audio data compression according to the selected compression ratio, done, the source device 12 may determine the streaming rate as a number of bits per second to deliver to the communication channel (e.g., Bluetooth®, WiFi, etc.) As such, the streaming rate is time-variant, subject to changes to the compression ratio, in accordance with the hierarchical quantization techniques of this disclosure. As an example, the source device 12 may determine a nominal streaming rate or nominal bitrate (e.g., default streaming rate or bitrate) that corresponds to the nominal compression ratio described above.

Figure 7:
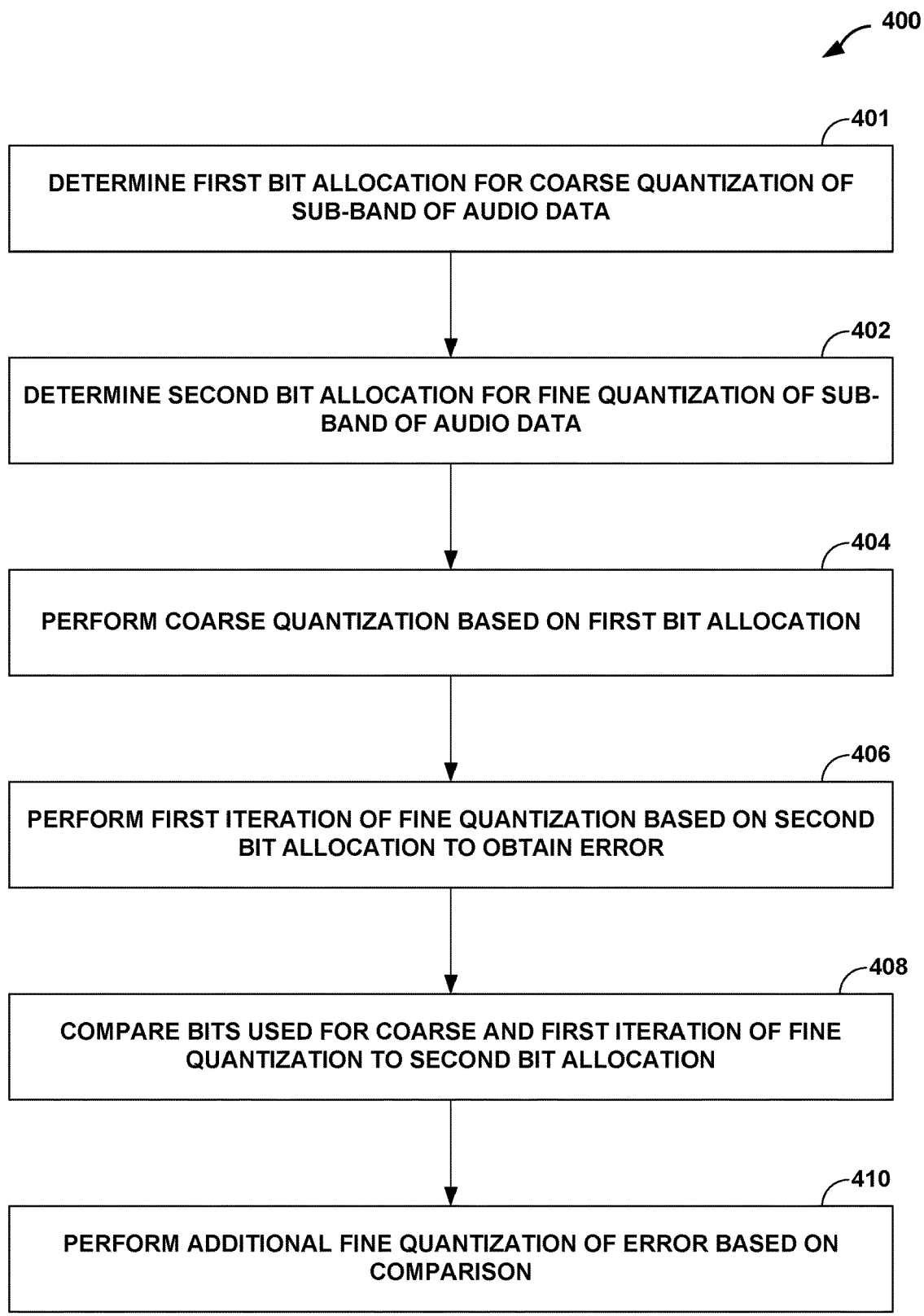
FIG. 7 is a flowchart illustrating a process that represents another example operation of the source device of FIG. 1 in performing various aspects of the techniques described in this disclosure.

FIG. 7 is a flowchart illustrating a process 400 that represents another example operation of the source device 12 of FIG. 1 (and/or components thereof) in performing various aspects of the techniques described in this disclosure. The process 400 may begin when the source device 12 determines a first bit allocation for coarse quantization of a sub-band of audio data (401). For instance, the audio data may be stored locally to a data storage component (e.g., a memory) of the source device 12, or the source device 12 may access the audio data from a remote storage location via a communicative connection (e.g., wired, wireless, etc.). The source device 12 may determine a second bit allocation for fine quantization of the sub-band of the audio data (402). For instance, the source device 12 may allocate a finite number of bits for fine quantization to be performed in addition to coarse quantization.

The source device 12 may perform coarse quantization on the sub-band of the audio data based on the first bit allocation (404). The source device 12 may perform a first iteration of fine quantization on the coarsely-quantized sub-band data, based on the second bit allocation, to obtain an error (406). More specifically, the source device 12 may perform the first iteration of the fine quantization subsequently to the completion of the coarse quantization operations, to obtain the error. In turn, the source device 12 may compare the second bit allocation to a number of bits used for the combination of the coarse quantization and the first iteration of the fine quantization (408). Based on the comparison, the source device 12 may perform additional fine quantization of the error (410).

In some examples, the stored audio data includes a plurality of sub-bands that includes the sub-band, and the source device 12 performs the additional fine quantization with respect to the error associated with the sub-band based on a hierarchical fine quantization structure determined based on the comparison. In some examples, the source device 12 uses the hierarchical fine quantization structure to perform hierarchical fine quantization with respect to respective errors associated with each respective sub-band of the plurality of sub-bands.

In some examples, the stored audio data includes a plurality of sub-bands that includes the sub-band, and the source device 12 performs hierarchical fine quantization with respect to each respective sub-band of the plurality of sub-bands based on a respective hierarchical fine quantization structure determined individually with respect to each respective sub-band of the plurality of sub-bands. In some examples, the source device 12 determines an energy level of the sub-band of the stored audio data. In some examples, the source device 12 performs a gain-shape analysis with respect to the sub-band to determine the energy level, and performs the additional fine quantization with respect to the energy level of the sub-band. In some examples, the source device 12 may perform the gain-shape analysis by performing pyramid vector quantization.

In some examples, the source device 12 includes a transceiver configured to output the bitstream via a wireless connection in accordance with a wireless communication protocol. In some examples, the wireless communication protocol may include, be, or be part of a personal area network wireless communication protocol. In some examples, the personal area network wireless communication protocol may include, be, or be part of a Bluetooth® wireless communication protocol. In some examples, the source device 12 receives the audio data from a microphone. In some examples, the source device 12 includes a microphone configured to capture the audio data.

Figure 8:
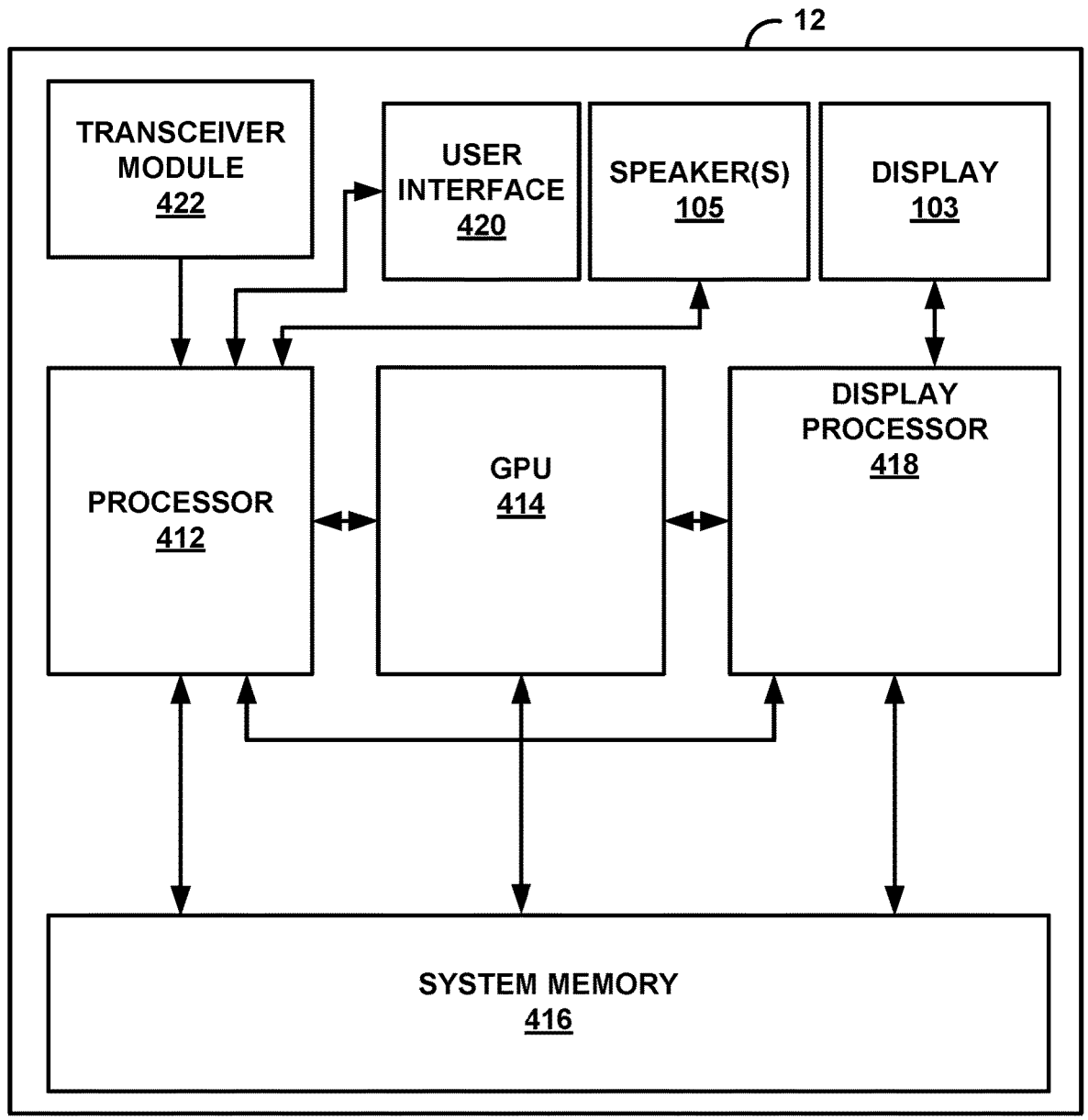
FIG. 8 is a block diagram illustrating example components of the source device shown in the example of FIG. 1.

FIG. 8 is a block diagram illustrating example components of the source device 12 shown in the example of FIG. 1. In the example of FIG. 8, the source device 8 includes a processor 412, a graphics processing unit (GPU) 414, system memory 416, a display processor 418, one or more integrated speakers 105, a display 103, a user interface 420, and a transceiver module 422. In examples where the source device 12 is a mobile device, the display processor 418 is a mobile display processor (MDP). In some examples, such as examples where the source device 12 is a mobile device, the processor 412, the GPU 414, and the display processor 418 may be formed as an integrated circuit (IC).

For example, the IC may be considered as a processing chip within a chip package and may be a system-on-chip (SoC). In some examples, two of the processors 412, the GPU 414, and the display processor 418 may be housed together in the same IC and the other in a different integrated circuit (i.e., different chip packages) or all three may be housed in different ICs or on the same IC. However, it may be possible that the processor 412, the GPU 414, and the display processor 418 are all housed in different integrated circuits in examples where the source device 12 is a mobile device.

Examples of the processor 412, the GPU 414, and the display processor 418 include, but are not limited to, one or more digital signal processors (DSPs), general purpose microprocessors, application specific integrated circuits (ASICs), field programmable logic arrays (FPGAs), processing circuitry (including fixed function circuitry and/or programmable processing circuitry), or other equivalent integrated or discrete logic circuitry. The processor 412 may be the central processing unit (CPU) of the source device 12. In some examples, the GPU 414 may be specialized hardware that includes processing circuitry (including fixed function circuitry and/or programmable processing circuitry), integrated and/or discrete logic circuitry that provides the GPU 414 with massive parallel processing capabilities suitable for graphics processing. In some instances, GPU 414 may also include general purpose processing capabilities, and may be referred to as a general-purpose GPU (GPGPU) when implementing general purpose processing tasks (i.e., non-graphics related tasks). The display processor 418 may also be specialized integrated circuit hardware that is designed to retrieve image content from the system memory 416, compose the image content into an image frame, and output the image frame to the display 103.

The processor 412 may execute various types of the applications 20. Examples of the applications 20 include web browsers, e-mail applications, spreadsheets, video games, other applications that generate viewable objects for display, or any of the application types listed in more detail above. The system memory 416 may store instructions for execution of the applications 20. The execution of one of the applications 20 on the processor 412 causes the processor 412 to produce graphics data for image content that is to be displayed and the audio data 21 that is to be played (possibly via integrated speaker 105). The processor 412 may transmit graphics data of the image content to the GPU 414 for further processing based on and instructions or commands that the processor 412 transmits to the GPU 414.

The processor 412 may communicate with the GPU 414 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and the processor 412 and the GPU 414 may utilize any technique for communication.

The system memory 416 may be the memory for the source device 12. The system memory 416 may comprise one or more computer-readable storage media. Examples of the system memory 416 include, but are not limited to, a random-access memory (RAM), an electrically erasable programmable read-only memory (EEPROM), flash memory, or other medium that can be used to carry or store desired program code in the form of instructions and/or data structures and that can be accessed by a computer or a processor.

In some examples, the system memory 416 may include instructions that cause the processor 412, the GPU 414, and/or the display processor 418 to perform the functions ascribed in this disclosure to the processor 412, the GPU 414, and/or the display processor 418. Accordingly, the system memory 416 may be a computer-readable storage medium having instructions stored thereon that, when executed, cause one or more processors (e.g., the processor 412, the GPU 414, and/or the display processor 418) to perform various functions.

The system memory 416 may include a non-transitory storage medium. The term "non-transitory" indicates that the storage medium is not embodied in a carrier wave or a propagated signal. However, the term "non-transitory" should not be interpreted to mean that the system memory 416 is non-movable or that its contents are static. As one example, the system memory 416 may be removed from the source device 12 and moved to another device. As another example, memory, substantially similar to the system memory 416, may be inserted into the source device 12. In certain examples, a non-transitory storage medium may store data that can, over time, change (e.g., in RAM).

The user interface 420 may represent one or more hardware or virtual (meaning a combination of hardware and software) user interfaces by which a user may interface with the source device 12. The user interface 420 may include physical buttons, switches, toggles, lights or virtual versions thereof. The user interface 420 may also include physical or virtual keyboards, touch interfaces—such as a touchscreen, haptic feedback, and the like.

The processor 412 may include one or more hardware units (including so-called "processing cores") configured to perform all or some portion of the operations discussed above with respect to one or more of the mixing unit 22, the audio encoder 24, the wireless connection manager 26, and the wireless communication units 30. The transceiver module 422 may represent a unit configured to establish and maintain the wireless connection between the source device 12 and the sink device 14. The transceiver module 422 may represent one or more receivers and one or more transmitters capable of wireless communication in accordance with one or more wireless communication protocols. The transceiver module 422 may perform all or some portion of the operations of one or more of the wireless connection manager 26 and the wireless communication units 30.

Figure 9:
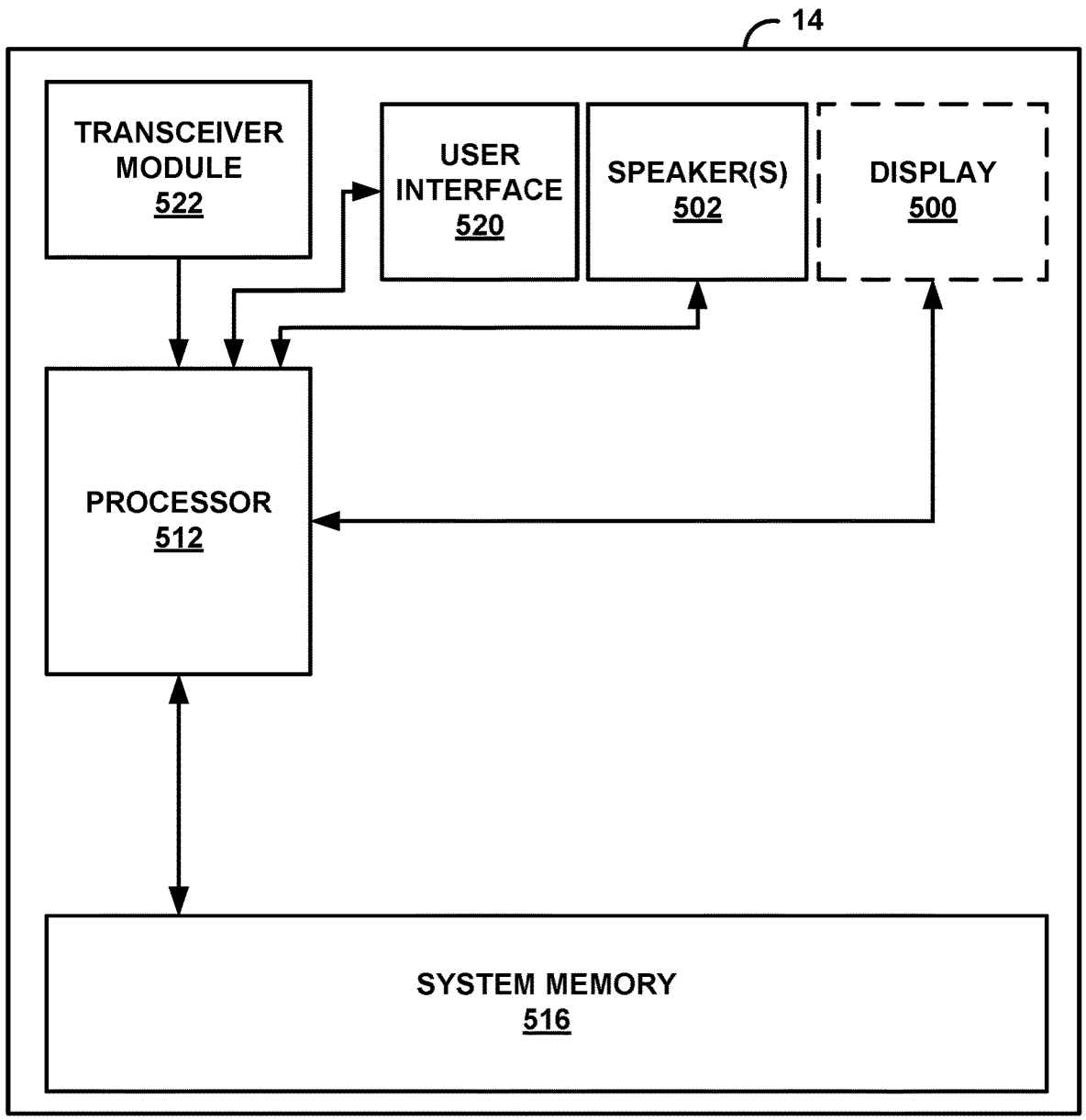
FIG. 9 is a block diagram illustrating exemplary components of the sink device shown in the example of FIG. 1.

FIG. 9 is a block diagram illustrating exemplary components of the sink device 14 shown in the example of FIG. 1. Although the sink device 14 may include components similar to that of the source device 12 discussed above in more detail with respect to the example of FIG. 8, the sink device 14 may, in certain instances, include only a subset of the components discussed above with respect to the source device 12.

In the example of FIG. 9, the sink device 14 includes one or more speakers 502, a processor 512, a system memory 516, a user interface 520, and a transceiver module 522. The processor 512 may be similar or substantially similar to the processor 412. In some instances, the processor 512 may differ from the processor 412 in terms of total processing capacity or may be tailored for low power consumption. The system memory 516 may be similar or substantially similar to the system memory 416. The speakers 502, the user interface 520, and the transceiver module 522 may be similar to or substantially similar to the respective speakers 402, user interface 420, and transceiver module 422. The sink device 14 may also optionally include a display 500, although the display 500 may represent a low power, low resolution (potentially a black and white LED) display by which to communicate limited information, which may be driven directly by the processor 512.

The processor 512 may include one or more hardware units (including so-called "processing cores") configured to perform all or some portion of the operations discussed above with respect to one or more of the wireless connection manager 40, the wireless communication units 42, and the audio decoder 44. The transceiver module 522 may represent a unit configured to establish and maintain the wireless connection between the source device 12 and the sink device 14. The transceiver module 522 may represent one or more receivers and one or more transmitters capable of wireless communication in accordance with one or more wireless communication protocols. The transceiver module 522 may perform all or some portion of the operations of one or more of the wireless connection manager 40 and the wireless communication units 28.

Figure 10:
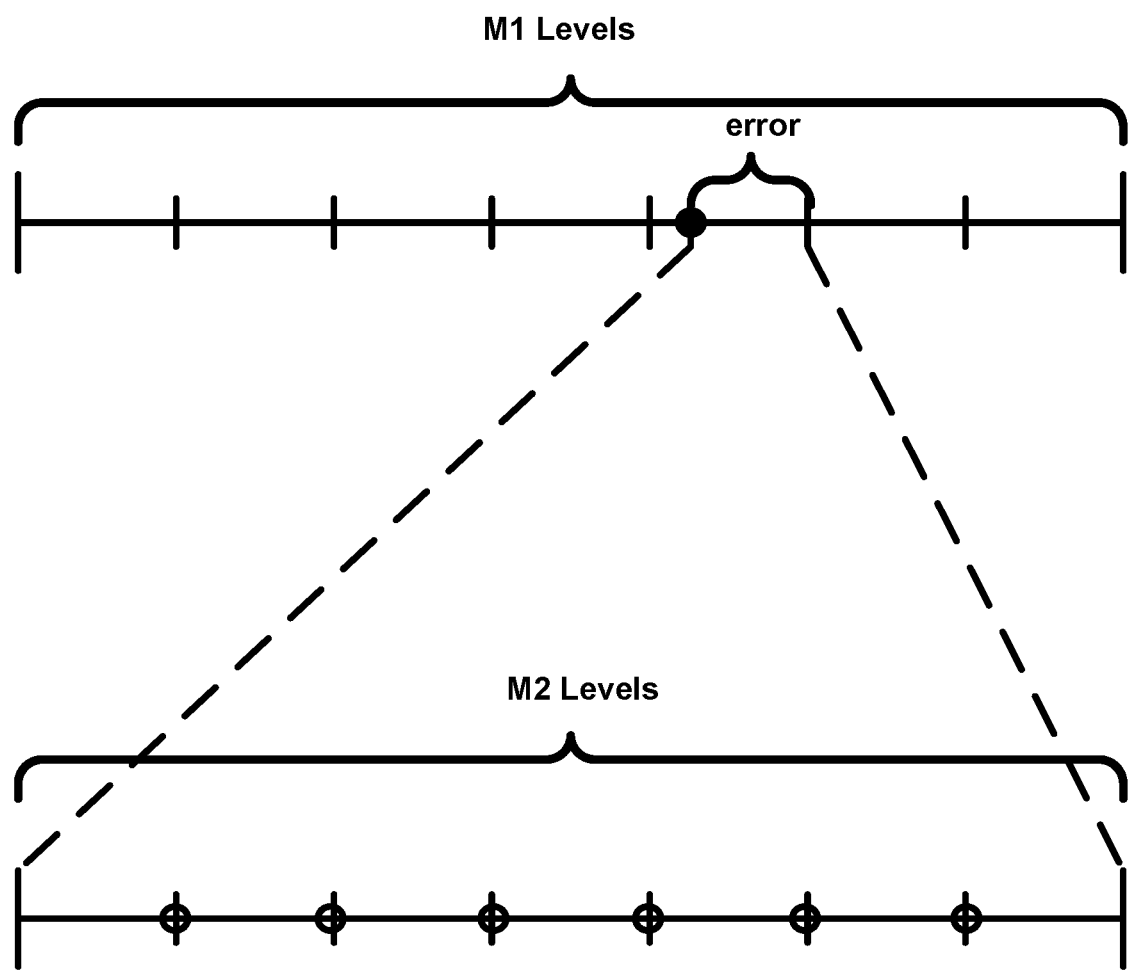
FIG. 10 is a diagram showing an example of a two-step uniform quantization process.

FIG. 10 is a diagram showing an example of a two-step uniform quantization process. As shown in FIG. 10, a coarse quantization process may use M1 levels (e.g., as determined by a number of bits allocated to the coarse quantization process) to quantize an input energy level. The difference between the output of the coarse quantization process and the input energy level is the error. The error may then be quantized by in a fine quantization process using M2 levels (e.g., as determined by a number of bits allocated to the fine quantization process).

Figure 11:
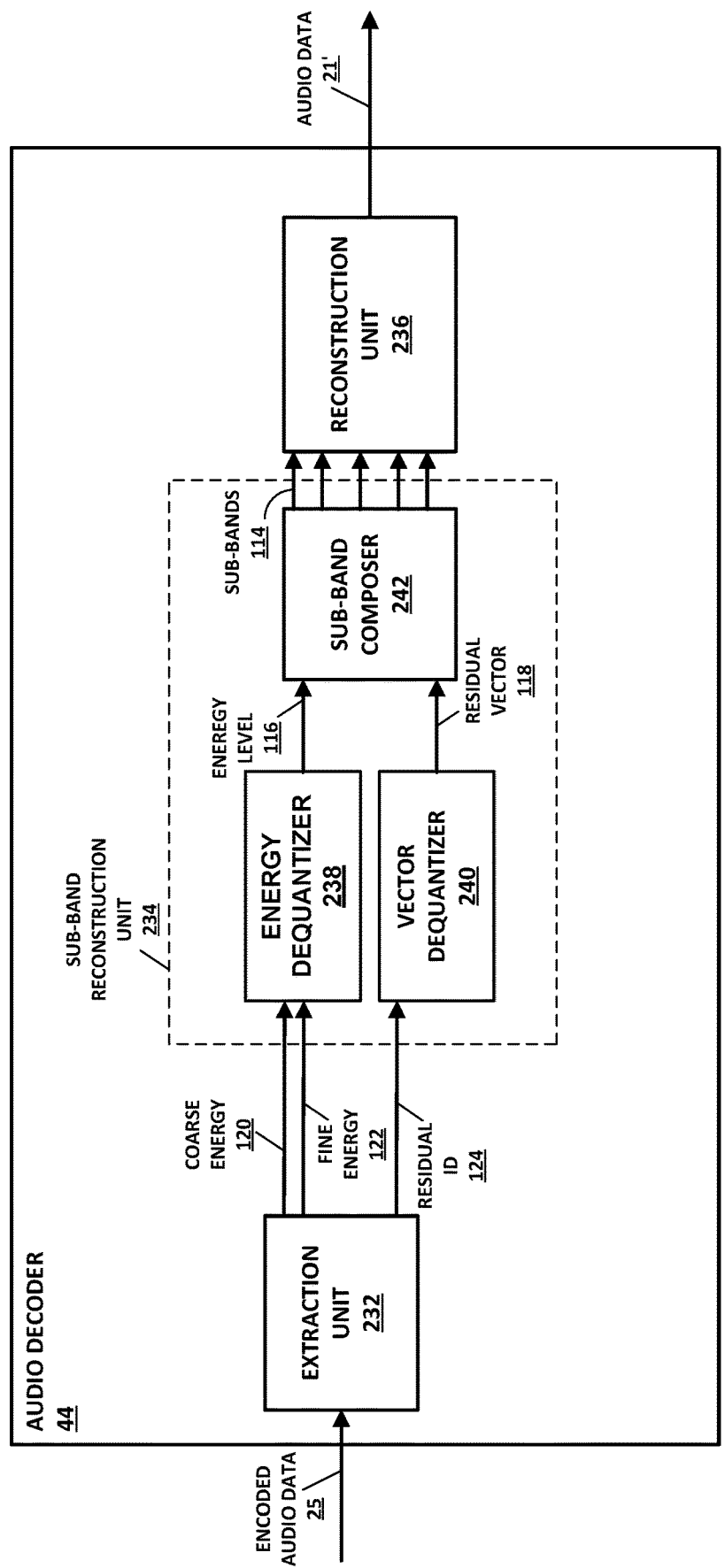
FIG. 11 is a block diagram illustrating an implementation of the audio decoder of FIG. 1 in more detail.

FIG. 11 is a block diagram illustrating an implementation of the audio decoder 44 of FIG. 1 in more detail. In the example of FIG. 11, the audio decoder 44 includes an extraction unit 232, a sub-band reconstruction unit 234, and a reconstruction unit 236. The extraction unit 232 may represent a unit configured to extract the coarse energy 120, the fine energy 122, and the residual ID 124 from the encoded audio data 25. The extraction unit 232 may extract, based on the energy bit allocation 203, one or more of the coarse energy 120, the fine energy 122, and the residual ID 124. The extraction unit 232 may output the coarse energy 120, the fine energy 122 and the residual ID 124 to the sub-band reconstruction unit 234.

The sub-band reconstruction unit 234 may represent a unit configured to operate in a manner that is reciprocal to the operation of the sub-band processing unit 128 of the audio encoder 24 shown in the example of FIG. 2. The sub-band reconstruction unit 234 may, in other words, reconstruct the sub-bands from the coarse energy 120, the fine energy 122, and the residual ID 124. The sub-band reconstruction unit 234 may include an energy dequantizer 238, a vector dequantizer 240, and a sub-band composer 242.

The energy dequantizer 238 may represent a unit configured to perform dequantization in a manner reciprocal to the quantization performed by the energy quantizer 106 illustrated in FIG. 2. The energy dequantizer 238 may perform dequantization with respect to the coarse energy 122 and the fine energy 122 to obtain the predicted/difference energy levels, which the energy dequantizer 238 may perform inverse prediction or difference calculations to obtain the energy level 116. The energy dequantizer 238 may output the energy level 116 to the sub-band composer 242.

If the encoded audio data 25 includes a syntax element set to a value indicating that the fine energy 122 was quantized hierarchically, then the energy dequantizer 238 may hierarchically dequantize the fine energy 122, in accordance with various aspects of this disclosure. In some examples, the encoded audio data 25 may include a syntax element that indicates whether the hierarchically-quantized fine energy 122 was formed using the same hierarchical quantization structure across all of the sub-bands 114, or a respective hierarchical quantization structure was determined individually with respect to each of the sub-bands 114. Based on the value of the syntax element, the energy dequantizer 238 may either apply the same hierarchical dequantization structure across all of the sub-bands 114 as represented by the fine energy 122, or may update the hierarchical dequantization structure on a per-sub-band basis when dequantizing the fine energy 122.

The vector dequantizer 240 may represent a unit configured to perform vector dequantization in a manner reciprocal to the vector quantization performed by the vector quantizer 108. The vector dequantizer 240 may perform vector dequantization with respect to the residual ID 124 to obtain the residual vector 118. The vector dequantizer 240 may output the residual vector 118 to the sub-band composer 242.

The sub-band composer 242 may represent a unit configured to operate in a manner reciprocal to the gain-shape analysis unit 104. As such, the sub-band composer 242 may perform inverse gain-shape analysis with respect to the energy level 116 and the residual vector 118 to obtain the sub-bands 114. The sub-band composer 242 may output the sub-bands 114 to the reconstruction unit 236.

The reconstruction unit 236 may represent a unit configured to reconstruct, based on the sub-bands 114, the audio data 21'. The reconstruction unit 236 may, in other words, perform inverse sub-band filtering in a manner reciprocal to the sub-band filtering applied by the sub-band filter 102 to obtain the frequency domain audio data 112. The reconstruction unit 236 may next perform an inverse transform in a manner reciprocal to the transform applied by the transform unit 100 to obtain the audio data 21'.

In this way, the audio decoder 44 may adapt the controller 202 according to a semi-supervised machine learning algorithm, the controller configured to determine bit distributions (or, in other words, bit allocations 203 and 205) across the sub-bands 114 of transformed audio data 25. The audio decoder 44 may then obtain, based on the bit allocation 203 and 205 and from the bitstream 25 (which may also be referred to as encoded audio data 25), the sub-bands 114 of the transformed audio data 25. The audio decoder 44 may next obtain, based on the sub-bands 114 of the transformed audio data, the transformed audio data. The audio decoder 44 may apply an inverse transform to the transformed audio data to obtain the audio data 21'.

Figure 12:
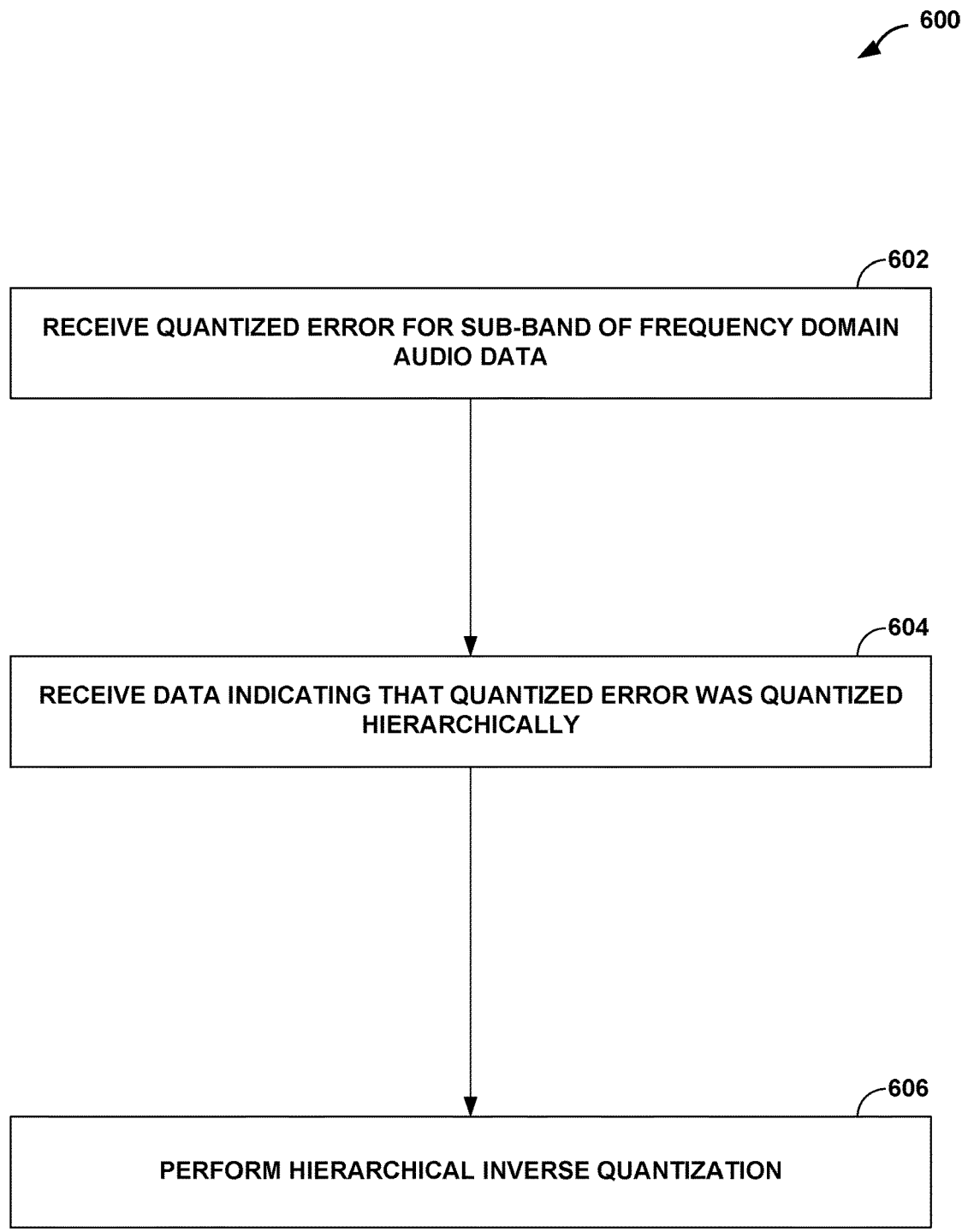
FIG. 12 is a flowchart illustrating a process that represents an example operation of the sink device of FIG. 1 in performing various aspects of the techniques described in this disclosure.

FIG. 12 is a flowchart illustrating a process 600 that represents an example operation of the sink device 14 of FIG. 1 (and/or components thereof, such as processor(s) or processing circuitry processing circuitry, such as fixed function circuitry and/or programmable processing circuitry, thereof) in performing various aspects of the techniques described in this disclosure. The process 600 may begin when the sink device 14 receives a quantized error associated with a sub-band of frequency domain audio data (602). In various examples, the frequency domain audio data may be stored locally to a data storage component (e.g., a memory) of the sink device 14, or the sink device 14 may access the frequency domain audio data from a remote storage location via a communicative connection (e.g., wired, wireless, etc.).

The sink device 14 may receive a syntax element that is set to a value indicating that the quantized error was quantized hierarchically, e.g., using a hierarchical fine quantization process (602). Based on the value of the received syntax element, the sink device 14 may perform a hierarchical inverse quantization with respect to the quantized error (604).

In some examples, the sink device 14 may perform the hierarchical inverse quantization with respect to the quantized error associated with the respective errors associated with each respective sub-band of the plurality of sub-bands based on a single hierarchical fine quantization structure. In some examples, the stored frequency domain audio data includes a plurality of sub-bands that includes the sub-band, and the sink device 14 performs the hierarchical inverse quantization with respect to the quantized error associated with the respective errors associated with each respective sub-band of the plurality of sub-bands based on a single hierarchical fine quantization structure.

In some examples, the stored frequency domain audio data includes a plurality of sub-bands that includes the sub-band, and the sink device 14 may perform the hierarchical inverse quantization with respect to the quantized error associated with the respective errors associated with each respective sub-band of the plurality of sub-bands based on a respective hierarchical fine quantization structure determined individually with respect to each respective sub-band of the plurality of sub-bands. In some examples, the sink device 14 includes a transceiver configured to receive a bitstream including the frequency domain audio data via a wireless connection in accordance with a wireless communication protocol. The wireless communication protocol may, in various examples, include, be, or be part of a personal area network wireless communication protocol. The personal area network wireless communication protocol may, in various examples, include, be, or be part of a Bluetooth® wireless communication protocol.

In some examples, the sink device 14 may render the audio data to one or more speaker feeds, and output the speaker feeds to one or more speakers. In some examples, the sink device 14 may render the audio data to one or more speaker feeds, and may include one or more speakers that reproduce, based on the speaker feeds, a soundfield.

The foregoing techniques may be performed with respect to any number of different contexts and audio ecosystems. A number of example contexts are described below, although the techniques should be limited to the example contexts. One example audio ecosystem may include audio content, movie studios, music studios, gaming audio studios, channel-based audio content, coding engines, game audio stems, game audio coding/rendering engines, and delivery systems.

The movie studios, the music studios, and the gaming audio studios may receive audio content. In some examples, the audio content may represent the output of an acquisition. The movie studios may output channel-based audio content (e.g., in 2.0, 5.1, and 7.1) such as by using a digital audio workstation (DAW). The music studios may output channel-based audio content (e.g., in 2.0, and 5.1) such as by using a DAW. In either case, the coding engines may receive and encode the channel-based audio content based one or more codecs (e.g., AAC, AC3, Dolby True HD, Dolby Digital Plus, and DTS Master Audio) for output by the delivery systems. The gaming audio studios may output one or more game audio stems, such as by using a DAW. The game audio coding/rendering engines may code and or render the audio stems into channel-based audio content for output by the delivery systems. Another example context in which the techniques may be performed comprises an audio ecosystem that may include broadcast recording audio objects, professional audio systems, consumer on-device capture, high-order ambisonics (HOA) audio format, on-device rendering, consumer audio, TV, and accessories, and car audio systems.

The broadcast recording audio objects, the professional audio systems, and the consumer on-device capture may all code their output using HOA audio format. In this way, the audio content may be coded using the HOA audio format into a single representation that may be played back using the on-device rendering, the consumer audio, TV, and accessories, and the car audio systems. In other words, the single representation of the audio content may be played back at a generic audio playback system (i.e., as opposed to requiring a particular configuration such as 5.1, 7.1, etc.), such as audio playback system 16.

Other examples of context in which the techniques may be performed include an audio ecosystem that may include acquisition elements, and playback elements. The acquisition elements may include wired and/or wireless acquisition devices (e.g., microphones), on-device surround sound capture, and mobile devices (e.g., smartphones and tablets). In some examples, wired and/or wireless acquisition devices may be coupled to mobile device via wired and/or wireless communication channel(s).

In accordance with one or more techniques of this disclosure, the mobile device may be used to acquire a soundfield. For instance, the mobile device may acquire a soundfield via the wired and/or wireless acquisition devices and/or the on-device surround sound capture (e.g., a plurality of microphones integrated into the mobile device). The mobile device may then code the acquired soundfield into various representations for playback by one or more of the playback elements. For instance, a user of the mobile device may record (acquire a soundfield of) a live event (e.g., a meeting, a conference, a play, a concert, etc.), and code the recording into various representation, including higher order ambisonic HOA representations.

The mobile device may also utilize one or more of the playback elements to playback the coded soundfield. For instance, the mobile device may decode the coded soundfield and output a signal to one or more of the playback elements that causes the one or more of the playback elements to recreate the soundfield. As one example, the mobile device may utilize the wireless and/or wireless communication channels to output the signal to one or more speakers (e.g., speaker arrays, sound bars, etc.). As another example, the mobile device may utilize docking solutions to output the signal to one or more docking stations and/or one or more docked speakers (e.g., sound systems in smart cars and/or homes). As another example, the mobile device may utilize headphone rendering to output the signal to a headset or headphones, e.g., to create realistic binaural sound.

In some examples, a particular mobile device may both acquire a soundfield and playback the same soundfield at a later time. In some examples, the mobile device may acquire a soundfield, encode the soundfield, and transmit the encoded soundfield to one or more other devices (e.g., other mobile devices and/or other non-mobile devices) for playback.

Yet another context in which the techniques may be performed includes an audio ecosystem that may include audio content, game studios, coded audio content, rendering engines, and delivery systems. In some examples, the game studios may include one or more DAWs which may support editing of audio signals. For instance, the one or more DAWs may include audio plugins and/or tools which may be configured to operate with (e.g., work with) one or more game audio systems. In some examples, the game studios may output new stem formats that support audio format. In any case, the game studios may output coded audio content to the rendering engines which may render a soundfield for playback by the delivery systems.

The mobile device may also, in some instances, include a plurality of microphones that are collectively configured to record a soundfield, including 3D soundfields. In other words, the plurality of microphone may have X, Y, Z diversity. In some examples, the mobile device may include a microphone which may be rotated to provide X, Y, Z diversity with respect to one or more other microphones of the mobile device.

A ruggedized video capture device may further be configured to record a soundfield. In some examples, the ruggedized video capture device may be attached to a helmet of a user engaged in an activity. For instance, the ruggedized video capture device may be attached to a helmet of a user whitewater rafting. In this way, the ruggedized video capture device may capture a soundfield that represents the action all around the user (e.g., water crashing behind the user, another rafter speaking in front of the user, etc.).

The techniques may also be performed with respect to an accessory enhanced mobile device, which may be configured to record a soundfield, including a 3D soundfield. In some examples, the mobile device may be similar to the mobile devices discussed above, with the addition of one or more accessories. For instance, a microphone, such as an Eigen microphone (EigenMike®) that represents one or more microphones configured to capture audio data or a combination of audio data and directional information, may be attached to the above noted mobile device to form an accessory enhanced mobile device. In this way, the accessory enhanced mobile device may capture a higher quality version of the soundfield than just using sound capture components integral to the accessory enhanced mobile device.

Example audio playback devices that may perform various aspects of the techniques described in this disclosure are further discussed below. In accordance with one or more techniques of this disclosure, speakers and/or sound bars may be arranged in any arbitrary configuration while still playing back a soundfield, including a 3D soundfield. Moreover, in some examples, headphone playback devices may be coupled to a decoder via either a wired or a wireless connection. In accordance with one or more techniques of this disclosure, a single generic representation of a soundfield may be utilized to render the soundfield on any combination of the speakers, the sound bars, and the headphone playback devices.

A number of different example audio playback environments may also be suitable for performing various aspects of the techniques described in this disclosure. For instance, a 5.1 speaker playback environment, a 2.0 (e.g., stereo) speaker playback environment, a 9.1 speaker playback environment with full height front loudspeakers, a 22.2 speaker playback environment, a 16.0 speaker playback environment, an automotive speaker playback environment, and a mobile device with ear bud playback environment may be suitable environments for performing various aspects of the techniques described in this disclosure.

In accordance with one or more techniques of this disclosure, a single generic representation of a soundfield may be utilized to render the soundfield on any of the foregoing playback environments. Additionally, the techniques of this disclosure enable a rendered to render a soundfield from a generic representation for playback on the playback environments other than that described above. For instance, if design considerations prohibit proper placement of speakers according to a 7.1 speaker playback environment (e.g., if it is not possible to place a right surround speaker), the techniques of this disclosure enable a render to compensate with the other 6 speakers such that playback may be achieved on a 6.1 speaker playback environment.

Moreover, a user may watch a sports game while wearing headphones. In accordance with one or more techniques of this disclosure, the soundfield, including 3D soundfields, of the sports game may be acquired (e.g., one or more microphones and/or Eigen microphones (EigenMike®) may be placed in and/or around the baseball stadium). HOA coefficients corresponding to the 3D soundfield may be obtained and transmitted to a decoder, the decoder may reconstruct the 3D soundfield based on the HOA coefficients and output the reconstructed 3D soundfield to a renderer, the renderer may obtain an indication as to the type of playback environment (e.g., headphones), and render the reconstructed 3D soundfield into signals that cause the headphones to output a representation of the 3D soundfield of the sports game.

In each of the various instances described above, it should be understood that the source device 12 may perform a method or otherwise comprise means to perform each step of the method for which the source device 12 is described above as performing. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the source device 12 has been configured to perform.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media. Data storage media may be any available media that can be accessed by one or more computers or one or more processors to retrieve instructions, code and/or data structures for implementation of the techniques described in this disclosure. A computer program product may include a computer-readable medium.

Likewise, in each of the various instances described above, it should be understood that the sink device 14 may perform a method or otherwise comprise means to perform each step of the method for which the sink device 14 is configured to perform. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the sink device 14 has been configured to perform.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or Various aspects of the techniques have been described. These and other aspects of the techniques are within the scope of the following claims.

What is claimed is:

1. A source device comprising:
   a memory configured to store audio data; and
   one or more processors in communication with the memory, the one or more processors being configured to:
   select, based on a nominal compression ratio or a streaming rate, a compression level of multiple compression levels, the multiple compression levels arranged hierarchically to allow for dynamic transitioning between the compression levels; and
   encode, based on the selected compression level of the multiple compression levels, the audio data stored to the memory,
   wherein, to encode the audio data, the one or more processors are configured to:
   determine a target bitrate based on an available streaming bandwidth;
   perform coarse quantization with respect to the audio data to obtain an error;
   multiplex, based on the available streaming bandwidth, between multiple fine energy levels associated with hierarchical fine quantization; and
   perform, to achieve the target bitrate, hierarchical fine quantization with respect to the error.

2. The source device of claim 1, wherein the selected compression level represents a higher compression level, and wherein the one or more processors are configured to transition the encoding of the audio data between the higher compression level and a lower compression level of the multiple compression levels.

3. The source device of claim 1, wherein the one or more processors are configured to:
   apply a sub-band filter to the audio data stored to the memory to obtain a plurality of sub-bands of the audio data, and
   use a hierarchical fine quantization structure to perform the hierarchical fine quantization with respect to respective errors associated with each respective sub-band of the plurality of sub-bands.

4. The source device of claim 1, wherein the one or more processors are configured to:
   apply a sub-band filter to the audio data stored to the memory to obtain a plurality of sub-bands of the audio data, and
   perform the hierarchical fine quantization with respect to each respective sub-band of the plurality of sub-bands based on a respective hierarchical fine quantization structure determined individually with respect to each respective sub-band of the plurality of sub-bands.

5. The source device of claim 1, wherein the one or more processors are configured to:
   apply a sub-band filter to the audio data stored to the memory to obtain a plurality of sub-bands of the audio data, and
   determine an energy level of a sub-band of the obtained plurality of sub-bands of the audio data.

6. The source device of claim 5, wherein the one or more processors are configured to perform a gain-shape analysis with respect to the sub-band to determine the energy level, and wherein the one or more processors are configured to perform the hierarchical fine quantization with respect to the energy level of the sub-band.

7. The source device of claim 6, wherein the one or more processors are configured to perform the gain-shape analysis by performing pyramid vector quantization.

8. The source device of claim 1, wherein the one or more processors include a transceiver configured to output a bitstream via a wireless connection in accordance with a wireless communication protocol.

9. The source device of claim 8, wherein the wireless communication protocol comprises a personal area network wireless communication protocol.

10. The source device of claim 9, wherein the personal area network wireless communication protocol comprises a Bluetooth® wireless communication protocol.

11. The source device of claim 1, wherein the one or more processors are further configured to receive the audio data from a microphone.

12. The source device of claim 1, further comprising a microphone configured to capture the audio data.

13. The source device of claim 1, wherein the one or more processors are further configured to apply a filter to the audio data stored to the memory to obtain a plurality of bands of the audio data.

14. A method of processing audio data, the method comprising:
   selecting, based on a nominal compression ratio or a streaming rate, a compression level of multiple compression levels, the multiple compression levels arranged hierarchically to allow for dynamic transitioning between the compression levels; and
   encoding the audio data based on the selected compression level of the multiple compression levels,
   wherein encoding the audio data comprises:
   determining a target bitrate based on an available streaming bandwidth;
   performing coarse quantization with respect to the audio data to obtain an error;
   multiplexing, based on the available streaming bandwidth, between multiple fine energy levels associated with hierarchical fine quantization; and
   performing, to achieve the target bitrate, hierarchical fine quantization with respect to the error.

15. The method of claim 14, wherein the selected compression level represents a higher compression level, the method further comprising:
   transitioning the encoding of the audio data between the higher compression level and a lower compression level of the multiple compression levels.

16. The method of claim 14, further comprising:
   applying a sub-band filter to the audio data to obtain a plurality of sub-bands of the audio data, and
   using a hierarchical fine quantization structure to perform the hierarchical fine quantization with respect to respective errors associated with each respective sub-band of the plurality of sub-bands.

17. The method of claim 14, further comprising:
   applying a sub-band filter to the audio data to obtain a plurality of sub-bands of the audio data, and
   performing the hierarchical fine quantization with respect to each respective sub-band of the plurality of sub-bands based on a respective hierarchical fine quantization structure determined individually with respect to each respective sub-band of the plurality of sub-bands.

18. The method of claim 14, further comprising:

applying a sub-band filter to the audio data to obtain a plurality of sub-bands of the audio data, and determine an energy level of a sub-band of the obtained plurality of sub-bands of the audio data.

19. The method of claim 18, further comprising:

performing a gain-shape analysis with respect to the sub-band to determine the energy level; and performing the hierarchical fine quantization with respect to the energy level of the sub-band.

20. The method of claim 19, further comprising performing the gain-shape analysis by performing pyramid vector quantization.

21. The method of claim 14, further comprising outputting a bitstream based on the audio data via a wireless connection in accordance with a wireless communication protocol.

22. The method of claim 21, wherein the wireless communication protocol comprises a personal area network wireless communication protocol.

23. The method of claim 22, wherein the personal area network wireless communication protocol comprises a Bluetooth® wireless communication protocol.

24. The method of claim 14, further comprising applying a filter to the audio data to obtain a plurality of bands of the audio data.

25. An apparatus configured to process audio data, the apparatus comprising:

means for selecting, based on a nominal compression ratio or a streaming rate, a compression level of multiple compression levels, the multiple compression levels arranged hierarchically to allow for dynamic transitioning between the compression levels; and means for encoding the audio data based on the selected compression level of the multiple compression levels, wherein the means for encoding comprise:

means for determining a target bitrate based on an available streaming bandwidth;

means for performing coarse quantization with respect to the audio data to obtain an error;

means for multiplexing, based on the available streaming bandwidth, between multiple fine energy levels associated with hierarchical fine quantization; and means for performing, to achieve the target bitrate, hierarchical fine quantization with respect to the error.

26. A non-transitory computer-readable storage medium encoded with instructions that, when executed, cause one or more processors of a source device to:

store audio data to the non-transitory computer-readable storage medium;

select, based on a nominal compression ratio or a streaming rate, a compression level of multiple compression levels, the multiple compression levels arranged hierarchically to allow for dynamic transitioning between the compression levels; and encode, based on the selected compression level of the multiple compression levels, the stored audio data, wherein the instructions that, when executed, cause the one or more processors to encode the audio data includes instructions that, when executed, cause the one or more processors to:

determine a target bitrate based on an available streaming bandwidth;

perform coarse quantization with respect to the audio data to obtain an error;

multiplex, based on the available streaming bandwidth, between multiple fine energy levels associated with hierarchical fine quantization; and perform, to achieve the target bitrate, hierarchical fine quantization with respect to the error.

* * * * *